(12) United States Patent
Zeira et al.

(10) Patent No.: US 10,306,125 B2
(45) Date of Patent: *May 28, 2019

(54) VIDEO CAMERA WITH PRIVACY

(71) Applicant: Belkin International Inc., Playa Vista, CA (US)

(72) Inventors: Ohad Zeira, Santa Monica, CA (US); Thorben Neu, Los Angeles, CA (US); Jon Plummer, Los Angeles, CA (US); Dale Honda, Torrance, CA (US); Steve Lane, Orange, CA (US); Joseph August, Los Angeles, CA (US); Peter Taylor, Marina Del Rey, CA (US); Oliver Duncan Seil, Santa Monica, CA (US); Michael Wick, Long Beach, CA (US); Paer Saangloef, Los Angeles, CA (US); Matt Glidden, Manhatten Beach, CA (US)

(73) Assignee: Belkin International, Inc., Playa Vista, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 14/878,698

(22) Filed: Oct. 8, 2015

(65) Prior Publication Data

US 2016/0105598 A1  Apr. 14, 2016

Related U.S. Application Data

(60) Provisional application No. 62/061,871, filed on Oct. 9, 2014.

(51) Int. Cl.
*H04N 5/232* (2006.01)
*H04N 5/225* (2006.01)

(52) U.S. Cl.
CPC ....... *H04N 5/23203* (2013.01); *H04N 5/2252* (2013.01); *H04N 5/2254* (2013.01); *H04N 5/23206* (2013.01)

(58) Field of Classification Search
CPC combination set(s) only.
See application file for complete search history.

(56) References Cited

U.S. PATENT DOCUMENTS 2,399,679 A   5/1946 Jackson
2,421,753 A   6/1947 Joyce
(Continued)

OTHER PUBLICATIONS

Cooper, Daniel, "Withings launches a CCTV baby cam that'll monitor your air quality," http://www.engadget.com/2014/09/04/withings-home-baby-monitor/ Sep. 4, 2014.
(Continued)

*Primary Examiner* — Janese Duley
(74) *Attorney, Agent, or Firm* — Kilpatrick Townsend & Stockton LLP

(57) ABSTRACT

Systems and methods are described for a network video camera device. Specifically, various techniques and systems are provided for embodiments of a network video camera with a blocking mechanism for privacy and control of the blocking mechanism. Embodiments of the present invention include a network video capture device. The network video capture device comprises a lens connected to a housing; a blocking mechanism, wherein the a blocking mechanism is configured to selectively block the lens from capturing video images, and wherein the blocking mechanism includes a physical body; an indication device, wherein the indication device is configured to provide visible feedback that the lens is blocked; and a circuit board having a data processor, a wireless transceiver, and a memory configured to store a customizable setting associated with the blocking mechanism.

19 Claims, 32 Drawing Sheets

(56) References Cited

U.S. PATENT DOCUMENTS

| | | |
|---|---|---|
| 2,428,412 A | 10/1947 | Dodkin |
| 2,582,087 A | 1/1952 | Turner et al. |
| 4,134,135 A | 1/1979 | Inokuchi et al. |
| 4,148,076 A | 4/1979 | Costello et al. |
| 4,279,487 A | 7/1981 | Baker et al. |
| 4,790,649 A | 12/1988 | Harada et al. |
| 5,095,196 A | 3/1992 | Miyata |
| 5,121,370 A | 6/1992 | Yanagi |
| 5,600,397 A | 2/1997 | Shiokama |
| 5,666,570 A | 9/1997 | Ohsawa |
| 5,815,745 A | 9/1998 | Ohsawa |
| 6,038,333 A | 3/2000 | Wang |
| 6,714,236 B1 | 3/2004 | Wada et al. |
| 6,812,958 B1 | 11/2004 | Silvester |
| 6,970,183 B1 | 11/2005 | Monroe |
| 7,631,806 B2 | 12/2009 | Wallerstorfer et al. |
| 7,733,371 B1 | 6/2010 | Monroe |
| 7,889,248 B2 | 2/2011 | Kawashima |
| 8,050,206 B2 | 11/2011 | Siann et al. |
| 8,237,856 B2 | 8/2012 | Boland et al. |
| 8,395,668 B2 | 3/2013 | Solomon |
| 8,570,381 B2 | 10/2013 | Solomon |
| 8,736,701 B2 | 5/2014 | Marman et al. |
| 8,749,343 B2 | 6/2014 | Cirker |
| 8,872,915 B1 * | 10/2014 | Scalisi ................... H04N 7/186 348/140 |
| 8,896,754 B2 | 11/2014 | Mundt et al. |
| 8,922,659 B2 | 12/2014 | Leny et al. |
| 2001/0019621 A1 | 9/2001 | Hanna et al. |
| 2003/0193562 A1 | 10/2003 | Corzillus |
| 2004/0109059 A1 * | 6/2004 | Kawakita ................. H04N 7/18 348/143 |
| 2004/0179121 A1 | 9/2004 | Silverstein |
| 2004/0250288 A1 | 12/2004 | Palmerio |
| 2005/0220361 A1 | 10/2005 | Yamasaki |
| 2006/0181612 A1 | 8/2006 | Lee et al. |
| 2006/0204035 A1 | 9/2006 | Guo et al. |
| 2007/0001117 A1 | 1/2007 | Sagatelyan |
| 2007/0076094 A1 | 4/2007 | Dickerson et al. |
| 2007/0103552 A1 | 5/2007 | Patel et al. |
| 2007/0118868 A1 | 5/2007 | Zhang et al. |
| 2007/0166001 A1 | 7/2007 | Barton et al. |
| 2007/0268367 A1 | 11/2007 | Agmon |
| 2007/0295899 A1 | 12/2007 | Sagatelyan |
| 2008/0199155 A1 | 8/2008 | Hagens et al. |
| 2009/0102924 A1 | 4/2009 | Masten, Jr. |
| 2009/0114804 A1 | 5/2009 | Sagatelyan |
| 2009/0167493 A1 | 7/2009 | Colciago |
| 2009/0174763 A1 | 7/2009 | Bengtsson et al. |
| 2009/0189981 A1 | 7/2009 | Siann et al. |
| 2009/0237516 A1 | 9/2009 | Jayachandra et al. |
| 2009/0295984 A1 | 12/2009 | Kawai et al. |
| 2009/0326979 A1 * | 12/2009 | Ryan .................... G06F 19/3418 705/2 |
| 2010/0002071 A1 * | 1/2010 | Ahiska ................... H04N 5/217 348/36 |
| 2010/0007744 A1 | 1/2010 | Oosawa |
| 2010/0014536 A1 | 1/2010 | Lin et al. |
| 2010/0026802 A1 | 2/2010 | Titus et al. |
| 2010/0026811 A1 | 2/2010 | Palmer |
| 2010/0141762 A1 * | 6/2010 | Siann ..................... H04N 7/185 348/143 |
| 2010/0283857 A1 | 11/2010 | Gopinath |
| 2010/0284568 A1 | 11/2010 | Tojo |
| 2011/0074918 A1 | 3/2011 | Klappert et al. |
| 2011/0078634 A1 | 3/2011 | Klappert et al. |
| 2011/0096168 A1 | 4/2011 | Siann et al. |
| 2011/0099908 A1 | 5/2011 | Fortmann |
| 2011/0134241 A1 | 6/2011 | Weissman |
| 2011/0285897 A1 | 11/2011 | Fujii |
| 2012/0092502 A1 * | 4/2012 | Knasel ................. G08B 13/196 348/159 |
| 2012/0151606 A1 | 6/2012 | Hannon |
| 2012/0179742 A1 | 7/2012 | Acharya et al. |
| 2012/0218416 A1 | 8/2012 | Leny et al. |
| 2012/0331499 A1 | 12/2012 | Hagens et al. |
| 2013/0021434 A1 | 1/2013 | Ahiska |
| 2013/0148852 A1 | 6/2013 | Partis et al. |
| 2013/0222609 A1 | 8/2013 | Soffer |
| 2014/0002588 A1 | 1/2014 | Ahiska |
| 2014/0152777 A1 | 6/2014 | Galor et al. |
| 2014/0160304 A1 | 6/2014 | Galor et al. |
| 2014/0218519 A1 | 8/2014 | Borovinov |
| 2014/0219431 A1 | 8/2014 | Wagner et al. |
| 2014/0321704 A1 | 10/2014 | Partis |
| 2015/0350612 A1 * | 12/2015 | Brunson ............... H04N 5/2251 348/143 |
| 2016/0105644 A1 * | 4/2016 | Smith ................ H04N 5/23206 348/159 |

OTHER PUBLICATIONS

Non-Final Office Action dated Jan. 29, 2015 for U.S. Appl. No. 14/487,018; 36 pages.

Non-Final Office Action dated Feb. 2, 2015 for U.S. Appl. No. 14/536,164; 33 pages.

Notice of Allowance dated Jun. 19, 2015 for U.S. Appl. No. 14/536,164; 13 pages.

Notice of Allowance dated Jun. 25, 2015 for U.S. Appl. No. 14/487,018; 17 pages.

\* cited by examiner

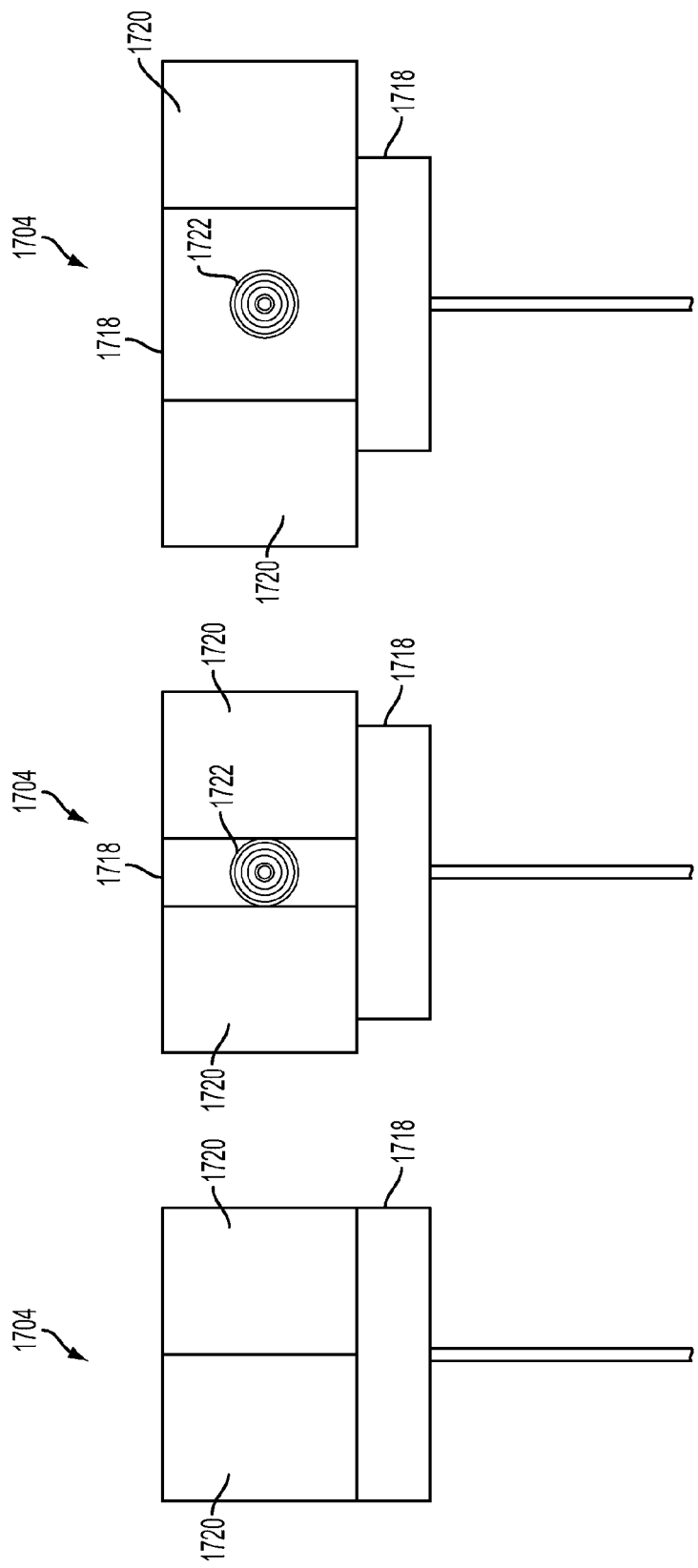

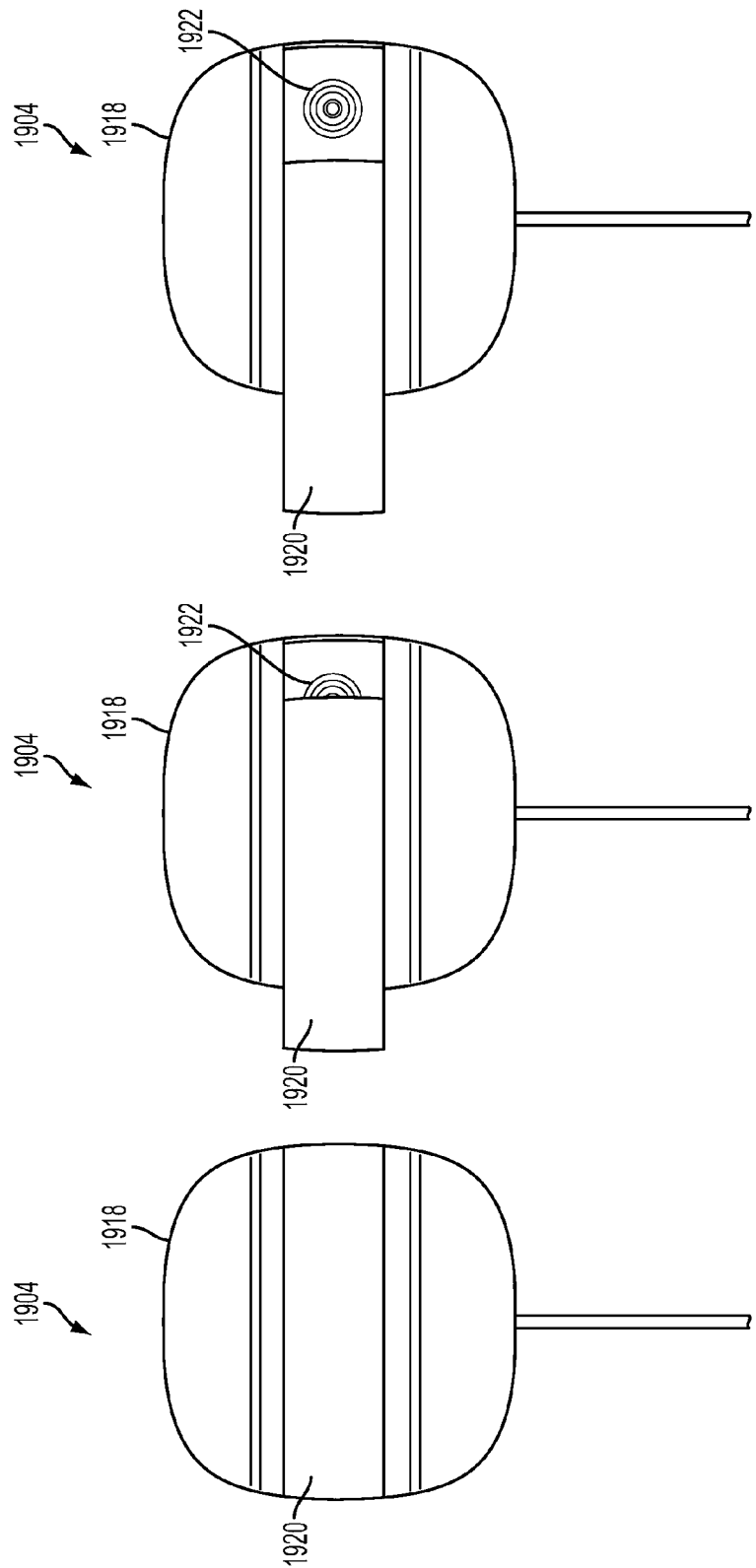

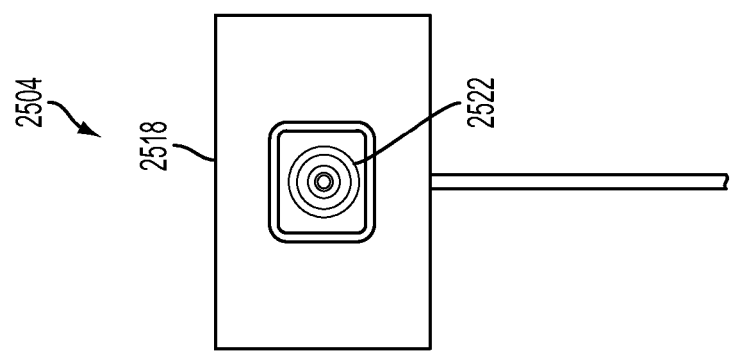
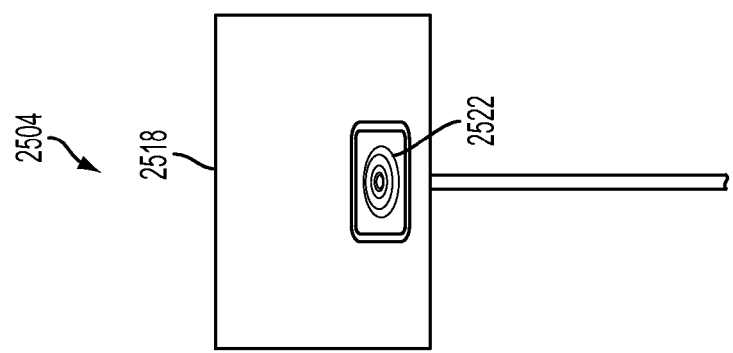
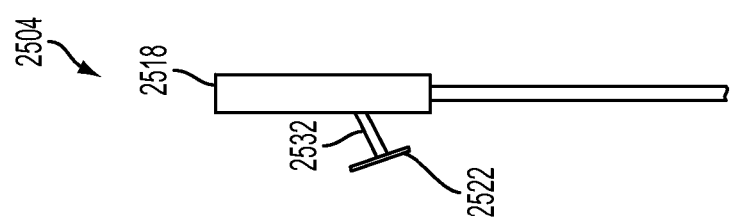
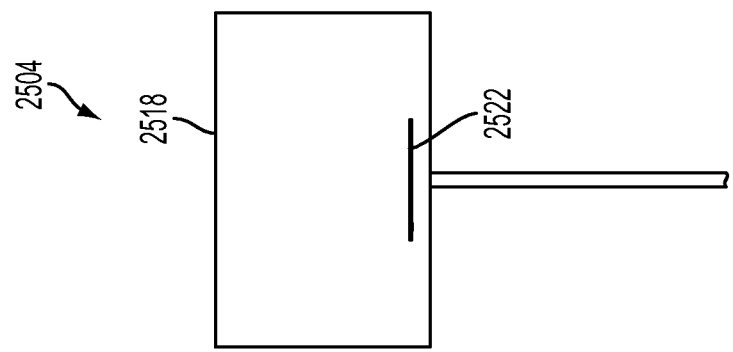

VIDEO CAMERA WITH PRIVACY

CROSS REFERENCE TO RELATED APPLICATIONS

This application claims priority to U.S. Provisional Application No. 62/061,871, filed Oct. 9, 2014, the disclosure of which is incorporated by reference herein in its entirety.

FIELD

The present disclosure relates to embodiments of a network video camera device. Specifically, various techniques and systems are provided for embodiments of a network video camera with a blocking mechanism for privacy and control of the blocking mechanism.

BRIEF SUMMARY

Embodiments of the present invention include a network video capture device. The network video capture device includes a lens connected to a housing; a blocking mechanism, wherein the blocking mechanism is configured to selectively block the lens from capturing video images, and wherein the blocking mechanism includes a physical body; an indication device, wherein the indication device is configured to provide visible feedback that the lens is blocked; and a circuit board having a data processor, a wireless transceiver, and a memory configured to store a customizable setting associated with the blocking mechanism.

In another aspect, the circuit board is configured to detect an occurrence of an event, and cause the blocking mechanism to block the lens from capturing video images, wherein the blocking mechanism is caused to block the lens when the occurrence of the event is detected. In another aspect, the indication device is a part of the blocking mechanism or the lens. In another aspect, the blocking mechanism is made up of a part of the housing. In another aspect, when the lens is blocked by the blocking mechanism, the lens is configured to operate as a motion sensor. In another aspect, when the lens is blocked by the blocking mechanism, the network video capture device is configured to capture audio. In another aspect, the circuit board is configured to generate a command, wherein the command is configured to cause a network device to perform an operation, wherein the network device and the network video capture device are connected to a local area network. In another aspect, the customizable setting includes a time period for blocking video capture. In another aspect, the one or more indication devices include an LED, a video display, or an audio speaker. In another aspect, the network video capture device comprises a second lens, and wherein the lenses comprise a video capture lens configured to capture video images and a motion sensor lens configured to detect motion.

Alternative embodiments of the present invention include a network video capture device system. The network video capture device system includes a lens; a housing connected to the lens; a linking device connected to the lens and to the housing, the linking device configured to move the lens towards the housing, wherein when the lens is proximate to the housing, the housing blocks the lens; and a processor configured to store a customizable setting associated with the linking device and configured to transmit communications to the network video capture device, wherein the communications include instructions to control the linking device.

In another aspect, the network video capture device system further comprises an indication device, wherein the indication device is configured to provide visible feedback that the lens is blocked. In another aspect, the indication device is a part of the housing or the lens. In another aspect, the indication device includes an LED, a video display, or an audio speaker. In another aspect, when the lens is blocked by the housing, the lens is configured to operate as a motion sensor. In another aspect, when the lens is blocked by the housing, the network video capture device is configured to capture audio. In another aspect, the processor is configured to generate a command, wherein the command is configured to cause a network device to perform an operation, wherein the network device and the network video capture device are connected to a local area network. In another aspect, the customizable setting includes a time period for blocking video capture. In another aspect, the network video capture device comprises a second lens, and wherein the lenses comprise a video capture lens configured to capture video images and a motion sensor lens configured to detect motion. In another aspect, the data processor is located within the housing.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 17A illustrates an example of a network video camera, in accordance with some embodiments.

FIG. 17B illustrates an example of a network video camera, in accordance with some embodiments.

FIG. 17C illustrates an example of a network video camera, in accordance with some embodiments.

FIG. 19A illustrates an example of a network video camera, in accordance with some embodiments.

FIG. 19B illustrates an example of a network video camera, in accordance with some embodiments.

FIG. 19C illustrates an example of a network video camera, in accordance with some embodiments.

FIG. 25A illustrates an example of a network video camera, in accordance with some embodiments.

FIG. 25B illustrates an example of a network video camera, in accordance with some embodiments.

FIGS. 25C and 25D illustrate examples of a network video camera, in accordance with some embodiments.

DETAILED DESCRIPTION

Figure 1:
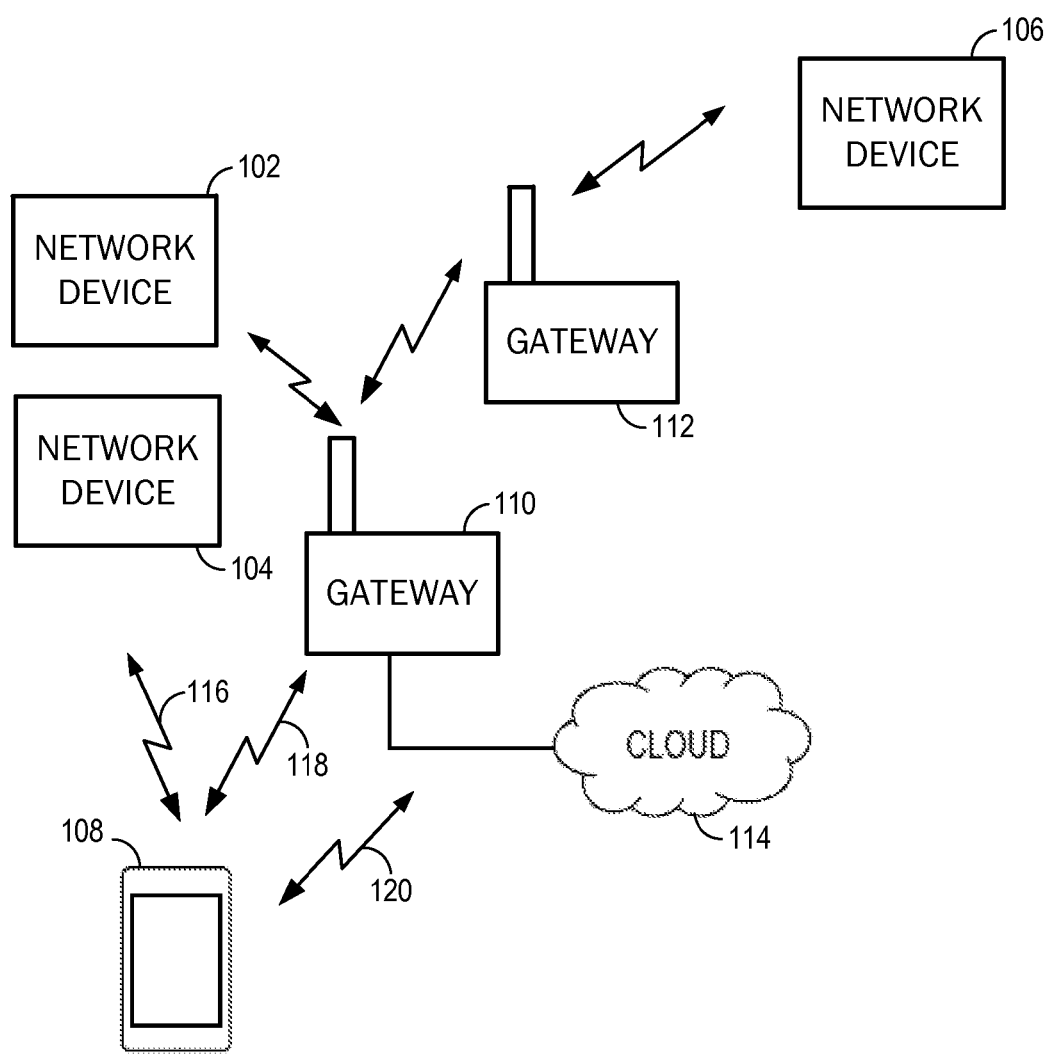
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the embodiments will provide those skilled in the art with an enabling description for implementing an embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
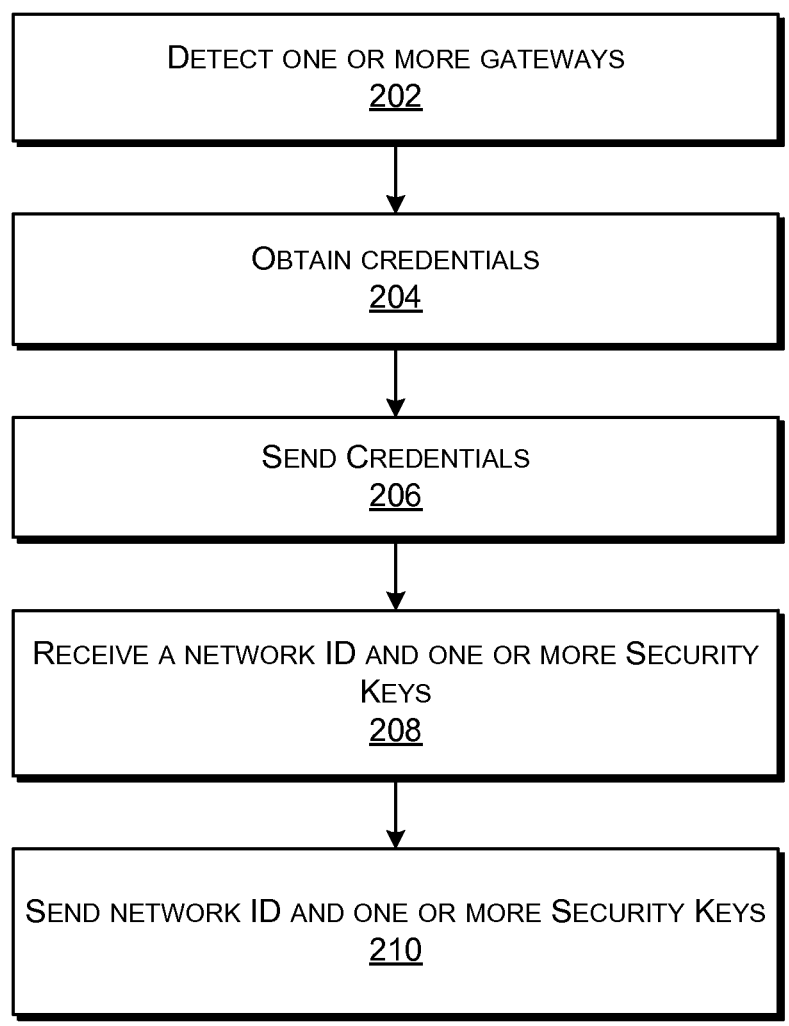
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":" ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status (es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
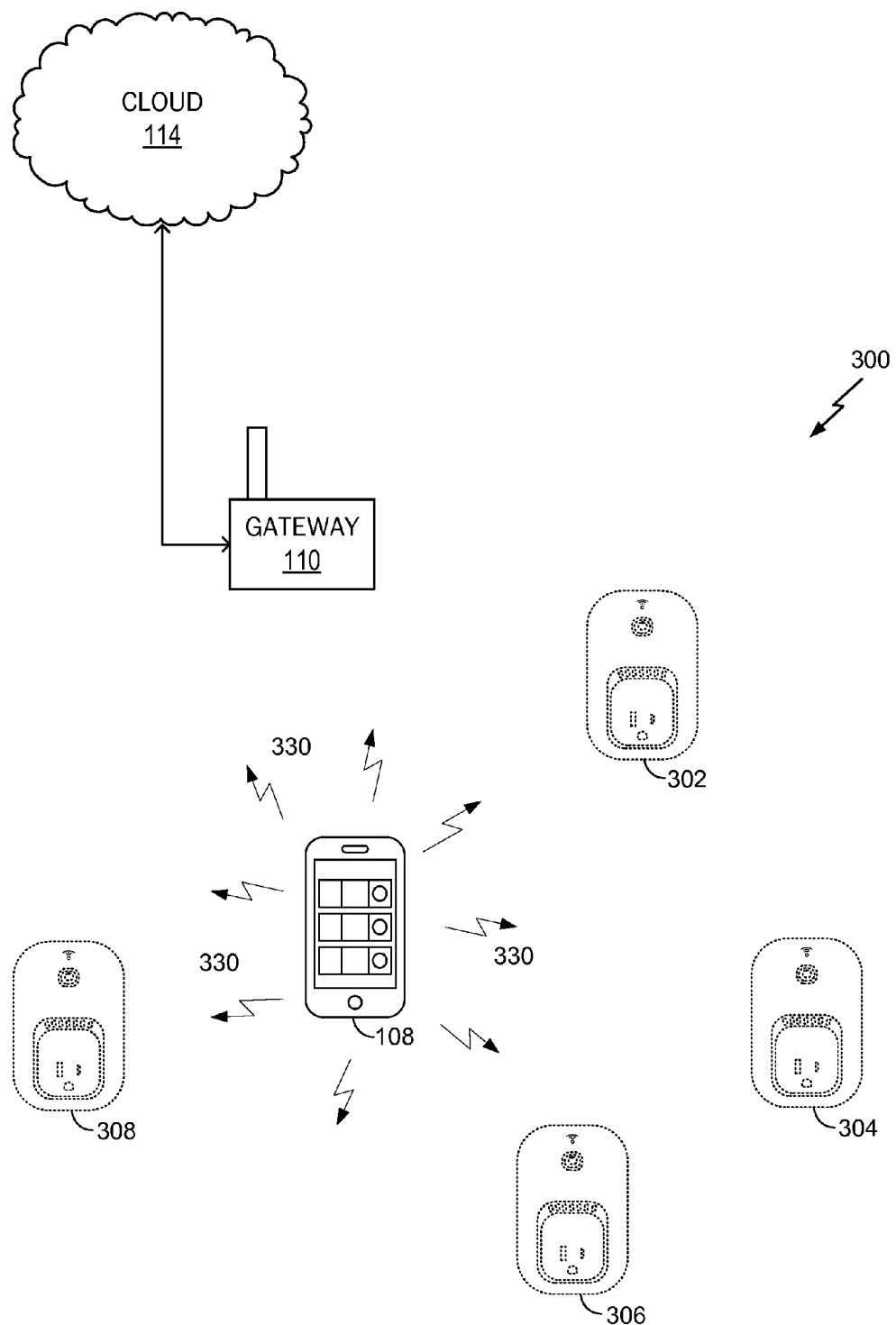
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
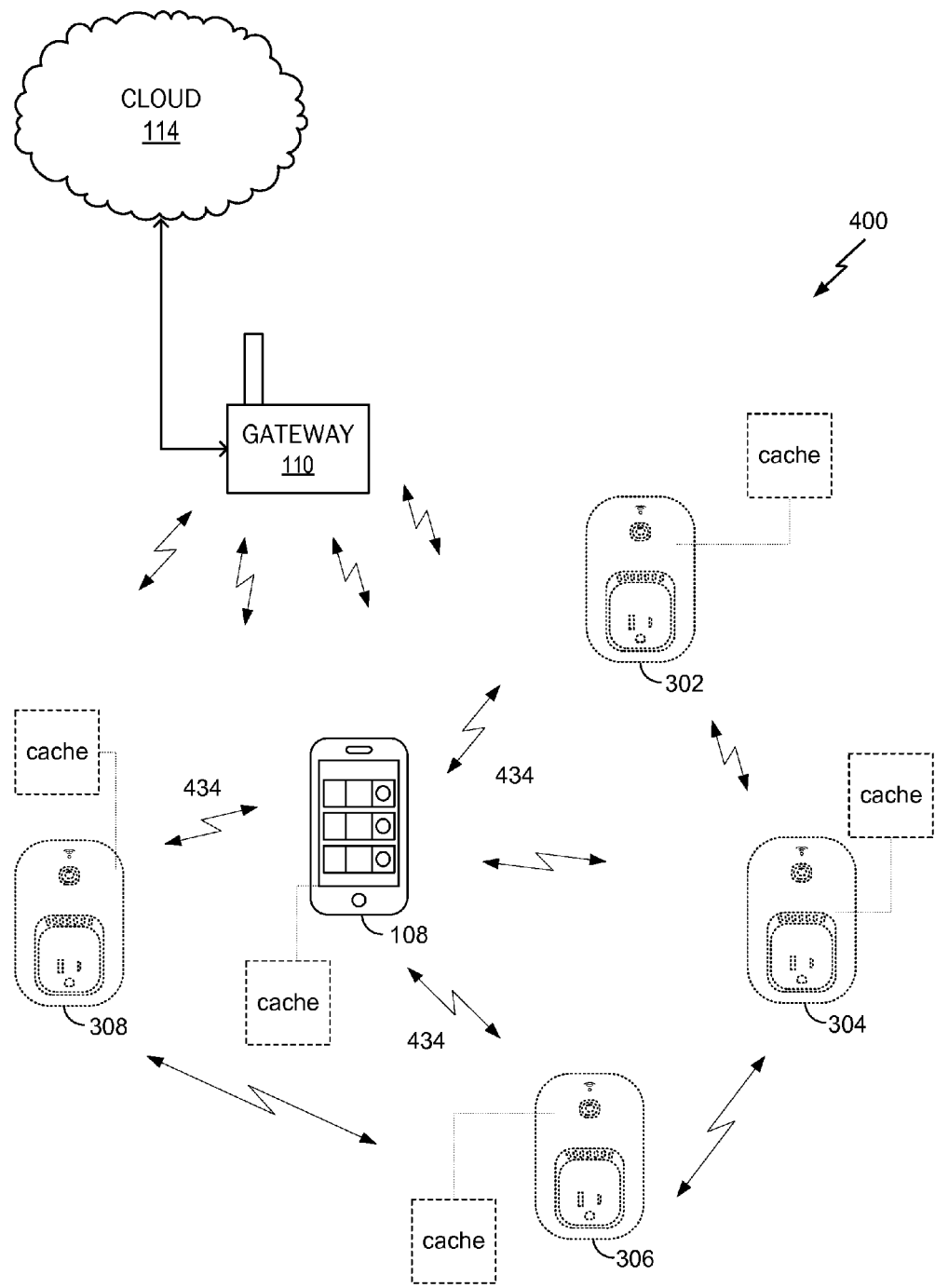
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308.

Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/ powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/ updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
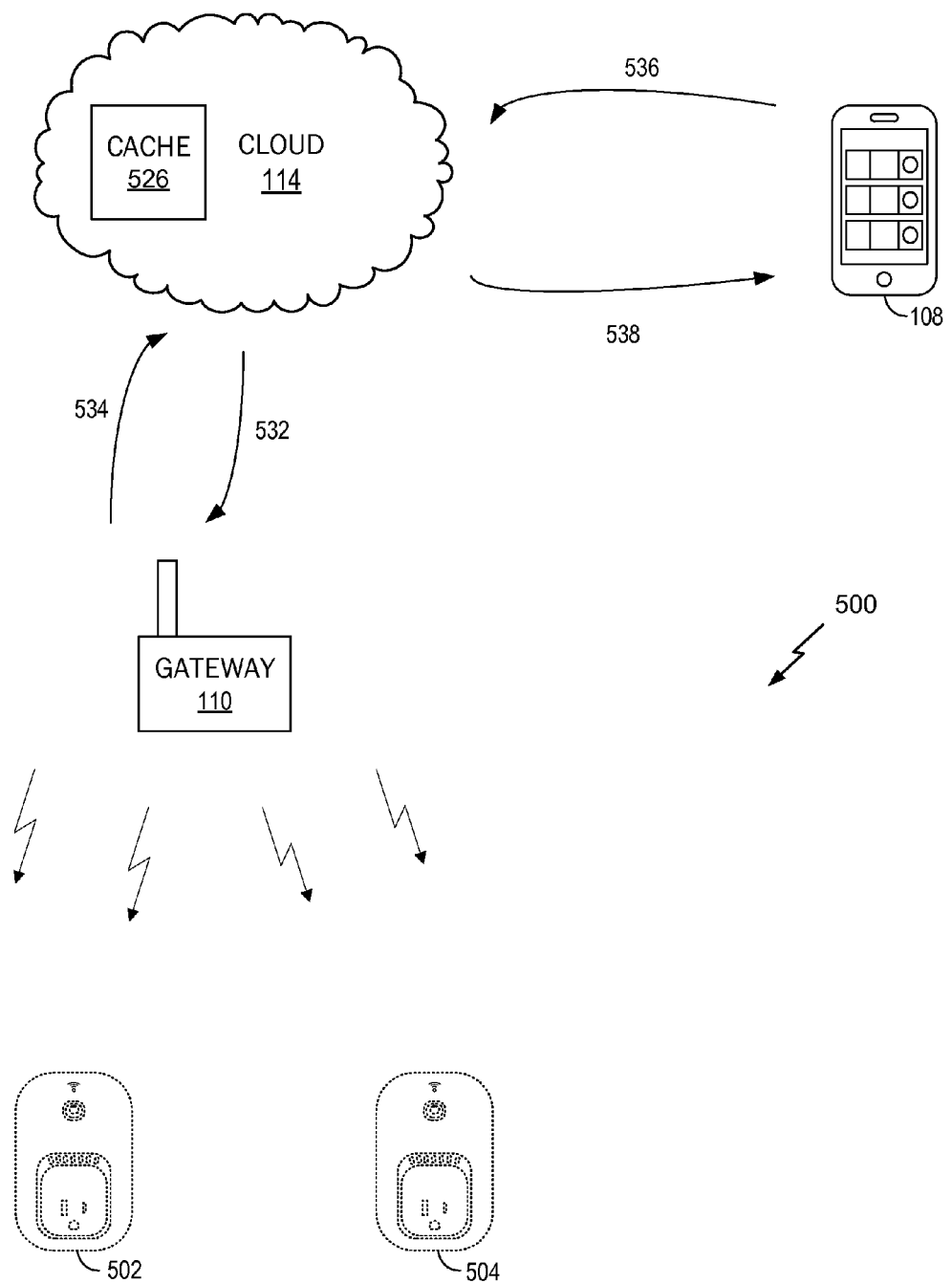
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
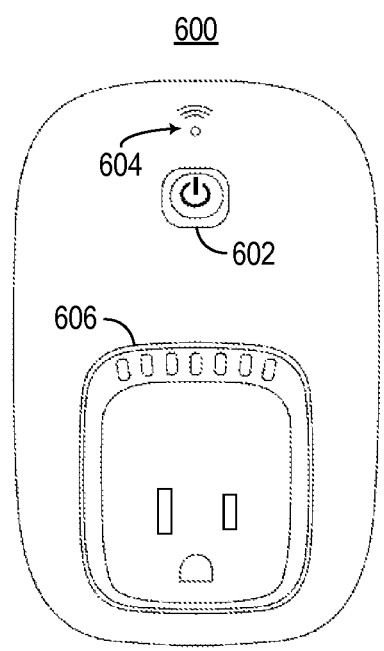
FIG. 6 is an illustration of an example of a front view of a network device, in accordance with an embodiment.
Figure 7:
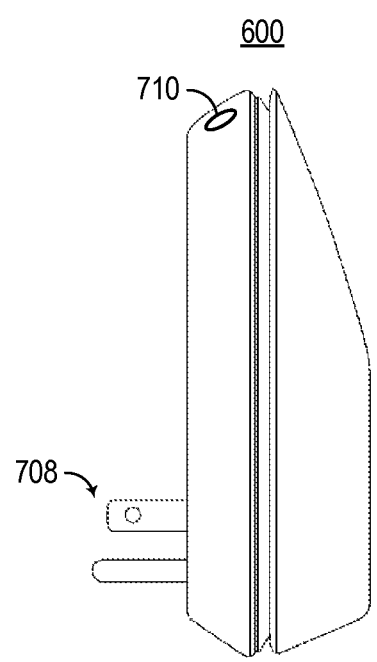
FIG. 7 is an illustration of an example of a side view of a network device, in accordance with an embodiment.

FIG. 6 illustrates an example of a front view of a network device 600. FIG. 7 illustrates an example of a side view of the network device 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes an power switch 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 and an outlet 606. The plug 708 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the socket 606 may be controlled by a user using an access device (e.g., access device 108).

Figure 8:
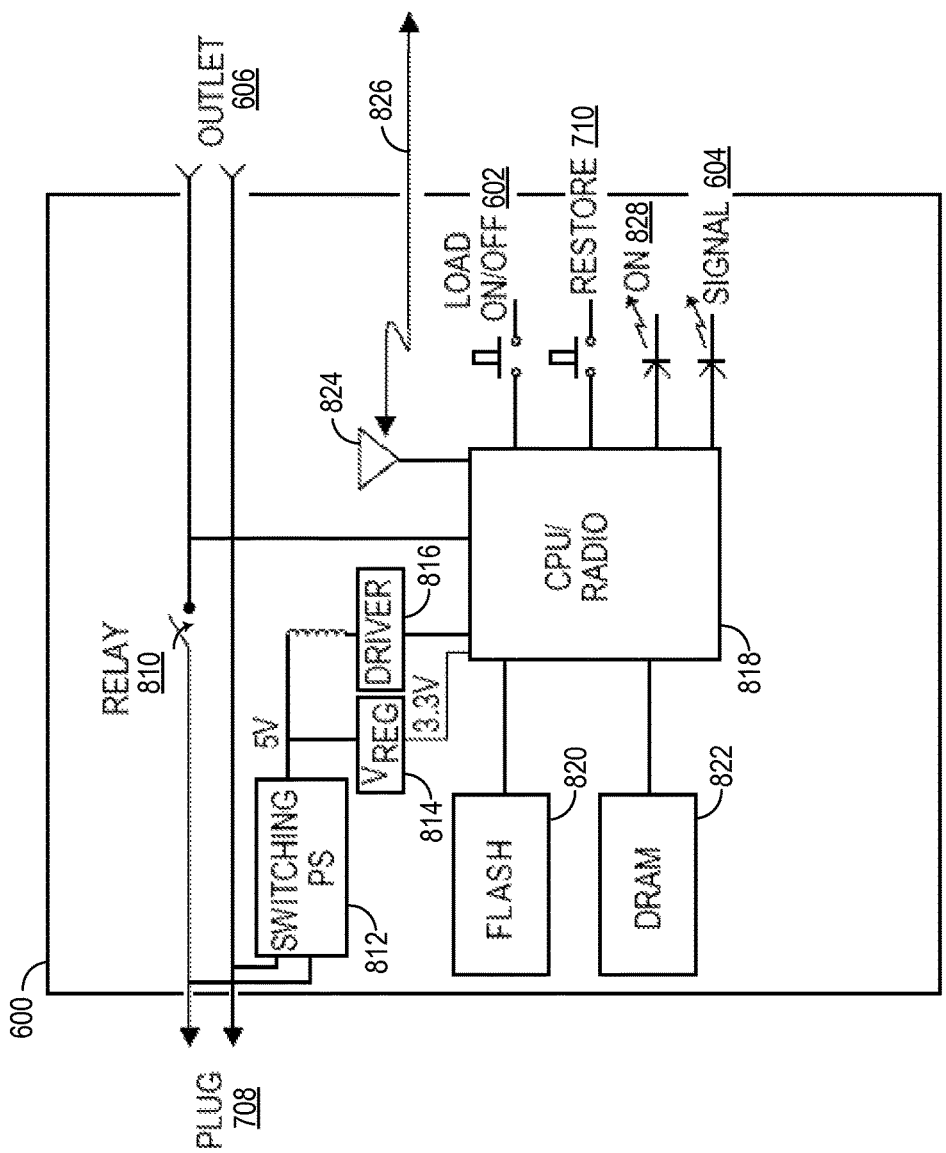
FIG. 8 is an example of a block diagram of a network device, in accordance with an embodiment.

FIG. 8 is an example of a block diagram of the network device 600 depicting different hardware and/or software components of the network device 600. As described above with respect to FIGS. 6 and 7, the network device 600 includes the outlet 606, the plug 708, the power button 602, the restore button 710, and the communications signal indicator 604. The network device 600 also includes light source 828 associated with the power button 602. As previously described, the light source 828 may be illuminated when the network device 600 is powered on.

The network device 600 further includes a relay 810. The relay 810 is a switch that controls whether power is relayed from the plug 708 to the outlet 606. The relay 810 may be controlled either manually using the power button 602 or remotely using wireless communication signals. For example, when the power button 602 is in an ON position, the relay 810 may be closed so that power is relayed from the plug 708 to the outlet 606. When the power button 602 is in an OFF position, the relay 810 may be opened so that current is unable to flow from the plug 708 to the outlet 606. As another example, an application or program running on an access device may transmit a signal that causes the relay 810 to be opened or closed. For instance, an access application may display a graphical interface on the access device that includes a power button. The user may tap or otherwise select the power button, and the access application may send a communication signal (e.g., over a WiFi network) to the network device 600 instructing the network device 600 to open or close the relay 810.

The network device 600 further includes flash memory 820 and dynamic random access memory (DRAM) 822. The flash memory 820 may be used to store instructions or code relating to an operating system, one or more applications, and any firmware. The flash memory 820 may include nonvolatile memory so that any firmware or other program can be can updated. In the event the network device 600 loses power, information stored in the flash memory 820 may be retained. The DRAM 822 may store various other types of information needed to run the network device 600, such as all runtime instructions or code.

The network device 600 further includes a CPU/Radio 818. The CPU/Radio 818 controls the operations of the network device 600. For example, the CPU/Radio 818 may execute various applications or programs stored in the flash memory 820 and/or the dynamic random access memory (DRAM) 822. The CPU/Radio 818 may also receive input from the various hardware and software components, interpret the input, and perform one or more functions in response to the input. As one example, the CPU/Radio 818 may determine whether the power button 602 has been pressed, and determines whether the relay 810 needs to be opened or closed. The CPU/Radio 818 may further perform all communications functions in order to allow the network device 600 to communicate with other network devices, one or more gateways, a cloud network, and/or one or more access devices. While the CPU and radio of the network device 600 are shown to be combined in the CPU/Radio 818, one of ordinary skill in the art will appreciate that, in some embodiments, the CPU and radio may be separately located within the network device 600. For example, CPU circuitry may be situated at a separate location on a circuit board from the location of radio circuitry, the CPU circuitry may be located on a different circuit board from the radio circuitry, or the like. Further, the network device 600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 600 does not include a cellular network transceiver radio or interface, and thus may not be configured to directly communicate with a cellular network. In some embodiments, the network device 600 may include a cellular network transceiver radio, and may be configured to communicate with a cellular network using the cellular network transceiver radio.

The network device 600 may communicate with other devices and/or networks via antenna 824. For example, antenna 824 may include a 2.4 GHz antenna, a 5 GHz antenna, or the like, that can transmit and receive WiFi communications signals. The network device 600 may include other types of antennas that can communicate Bluetooth® signals, Zigbee® signals, Ultra-Wideband (UWB) signals, WiFi-Direct signals, BLE signals, and/or the like. In some embodiments, the antenna 824 may be configured to communicate different types of signals, such as the WiFi signals, Bluetooth® signals, Zigbee® signals, UWB signals, WiFi-Direct signals, BLE signals, and/or the like. In some embodiments, the network device 600 may include multiple antennas for communicating the different types of communication signals. As one example, the network device 600 may include both a 2.4 GHz antenna and a 5 GHz antenna.

The network device 600 further includes a driver 816, a switching power supply 812, and a voltage regulator 814. The driver 816 may include instructions or code that can be used to translate control signals or commands received from applications running on the DRAM 822 to commands that the various hardware components in the network device 600 can understand. In some embodiments, the driver 816 may include an ambient application running on the DRAM 822. The switching power supply 812 may be used to transfer power from the outlet in which the plug 708 is connected to the various loads of the network device 600 (e.g., CPU/Radio 818). The switching power supply 812 may efficiently convert the voltage and current characteristics of the electrical power to a level that is appropriate for the components of the network device 600. For example, the switching power supply 812 may perform AC-DC conversion. In some embodiments, the switching power supply 812 may be used to control the power that is relayed from the plug 708 to the outlet 606. The voltage regulator 814 may be used to convert the voltage output from the switching power supply 812 to a lower voltage usable by the CPU/Radio 818. For example, the voltage regulator 814 may regulate the DC voltage from 5V to 3.3V.

In various embodiments, functions may be stored as one or more computer-program products, such as instructions or code, in a non-transitory machine-readable storage medium, such as the flash memory 820 and/or the DRAM 822. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 820 and/or the DRAM 822, may be a processor-readable memory and/or a computer-readable memory that stores software code (programming code, instructions, etc.) configured to cause a processor(s) within the CPU/Radio 818 to perform the functions described. In other embodiments, one or more of the functions described may be performed in hardware.

A set of these instructions and/or code might be stored on a non-transitory machine-readable storage medium, such as the flash memory 820 and/or the DRAM 822. In some cases, the storage medium might be incorporated within a computer system, such as the CPU/Radio 818. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 600 and/or might take the form of source and/or installable code, which, upon compilation and/or installation on the network device 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 600 may have other components than those depicted in FIGS. 6-8. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 9:
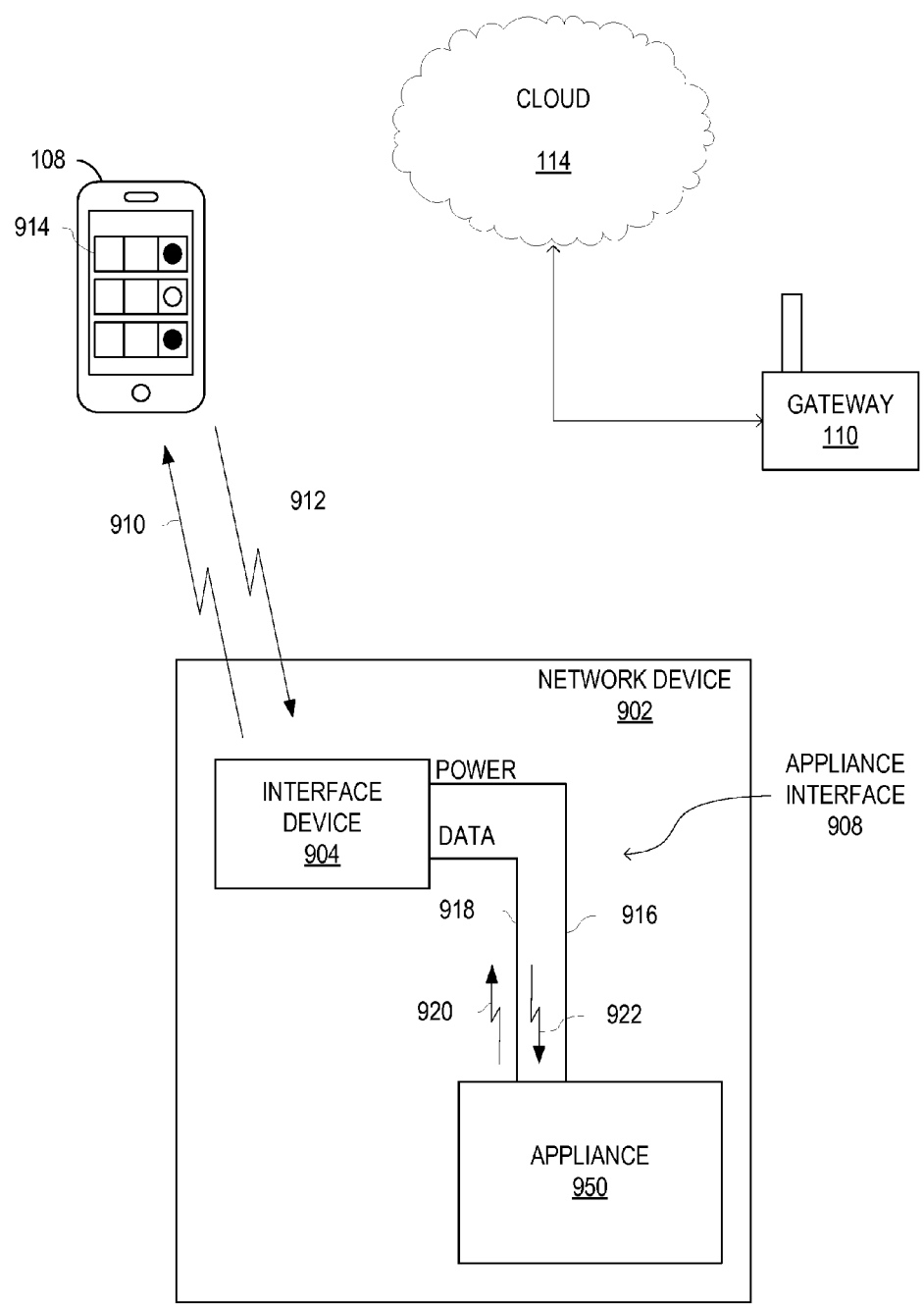
FIG. 9 is a schematic illustration of a local area network including a network device that includes an appliance, in accordance with an embodiment.

FIG. 9 is a schematic illustration of a local area network 900 including a network device 902 that includes an appliance 950. The network device 902 can comprise an interface device 904 and the appliance 950 connected by an appliance interface 908. The appliance interface 908 can include a data connection 918 and a power connection 916. The data connection 918 can be a serial connection (e.g., RS-232, USB, or other), or any other suitable data connection. The interface device 904 can be fully powered by the appliance 902 through the power connection 916, or can have a separate source of power.

The appliance 950 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 950 can be adapted to operate with the interface device 904. The appliance 950 can be any finite state machine. The appliance 950 can, but need not, know or store one or more states related to the appliance. For example, the appliance 950 may know or store data related to whether the appliance 950 is turned on, how long the appliance has been on (or off), among other status data.

The interface device 904 can be positioned within the housing of the appliance 950, or can be attached externally to the appliance 950. The interface device 904 can be removable from the appliance 950, or can be permanently installed in or on the appliance 950.

The interface device 904 can be connected to the local area network 900 through a network interface. The interface device 904 can be connected by a wired or wireless connection (e.g., WiFi, Zigbee, or others described herein or well known). In some embodiments, the interface device 904 can be connected directly to the cloud network 114 through a cellular internet connection (e.g., EDGE, LTE, or others).

The interface device 904 can communicate with another network device, an access device 108, or another client device through the network interface 906. The interface device 904 can transmit a status information signal 910 with status information to the access device 108, and the access device 108 can transmit a network device control signal 912 to the interface device 904. The status information signal 910 and the network device control signal 912 can be transmitted between the interface device 904 and the access device 108 using a telecommunications network (e.g., a cellular network, or other suitable broadband network), using a local area network 900 (e.g., through a gateway 110), or using the cloud network 114, although such a signal may pass through an intermediary device or network to do so.

The interface device 904 can interpret the network device control signal 912 and perform actions based on the contents of the network device control signal 912. The network device control signal 912 can include commands that can be performed by the interface device 904 itself. The network device control signal 912 can also include commands that are to be performed by the appliance 950. Commands that are to be performed by the appliance 950 can include commands like turn on or off, set a desired temperature (e.g., heat up or cool down to 215° F. or any other temperature), or other suitable commands depending on the particular appliance. The interface device 904 can interpret the network device control signal 912 and can send out a command 922, through the data connection 918 of the appliance interface 908, based on the network device control signal 912. The appliance 950 can then perform the command indicated in the network device control signal 912.

The interface device 904 can also transmit commands to the appliance 950 that are not based on a network device control signal received from the access device 108, but are rather based on programming in the interface device 904. Examples of such commands can include commands to update a communication rate, commands to check a state of the appliance 950, commands to set or get a clock time of the appliance 950, or any other suitable commands.

The interface device 904 can receive, through the data connection 918 of the appliance interface 908, a response (e.g., response 920) to any command from the appliance 950. In some examples, the response 920 can include an indication that the command 922 was received. In some examples, the response may include only an indication that a command is received (e.g., an ACK). In some examples, the response 920 can include information for some value on the appliance 950, such as an "on/off" state, a serial number, a product identification, a manufacturer identification, a temperature, a time since live, a setting, or any other value retrievable from the appliance 950. The interface device 904 can interpret the value and can send information about the value (e.g., the state of the appliance is "on," the temperature of the appliance, the time since the appliance first turned on, or other information) as status information (e.g. using status information signal 910) to the access device 108. Additionally, the interface device 904 can send status information about itself (e.g., time since live, supplied power, signal strength, and others) as status information (e.g. using status information signal 910) to the access device 108.

The interface device 904 can also use responses (e.g., response 920) from the appliance 950 to perform additional functions at the interface device 904, such as error handling. In some cases, when performing the additional functions, the interface device 904 does not transmit any status information 910 to the access device 108 based on those particular responses.

The access device 108 can include one or more display tiles (e.g., display tile 914) for displaying information and controls corresponding to the network device 102.

In some embodiments, the interface device 904 can transmit a heartbeat command (e.g., command 922) over the data connection 918 to the appliance 902 to determine whether the appliance 950 is working properly and/or in a state of readiness. If the interface device 904 determines that the appliance 950 has had some sort of failure (e.g., the appliance 950 sends a response 920 indicating a failure or the interface device 904 does not receive any response 920), the interface device 904 can take corrective action (e.g., restarting the appliance 950 or an element of the appliance 950), can log the event, or can alert the user).

Figure 10:
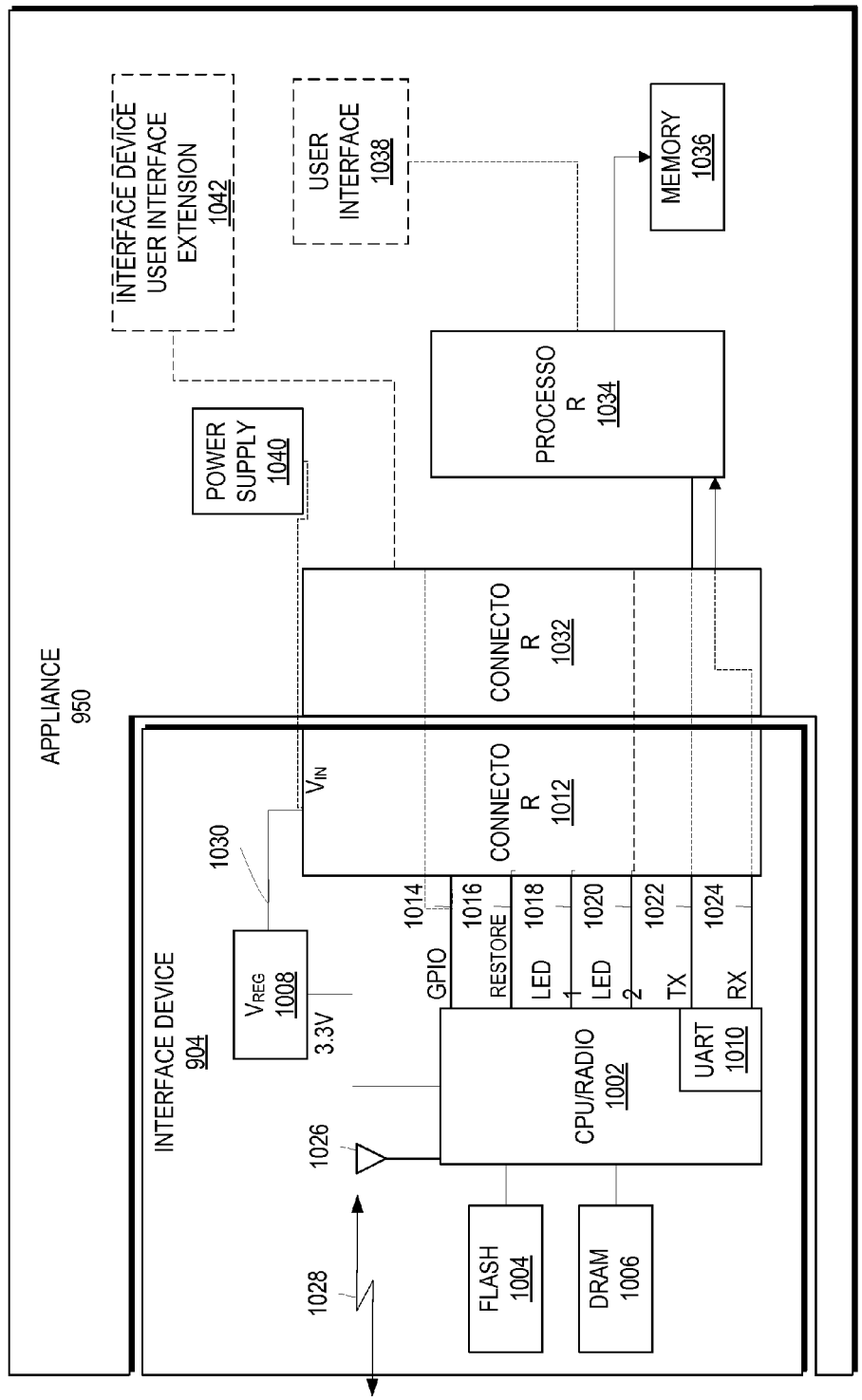
FIG. 10 is an example of a block diagram of a network device including an interface device attached to an appliance, in accordance with an embodiment.

FIG. 10 depicts a block diagram of a network device including an interface device 904 attached to an appliance 950 according to one embodiment. The interface device 904 can include connector 1012 that interacts with connector 1032 of the appliance 950.

The interface device 904 can include flash memory 1004 and dynamic random access memory (DRAM) 1006. The flash memory 1004 may be used to store instructions or code relating to an operating system, one or more applications, and any firmware. The flash memory 1004 can be used to store a cache. The flash memory 1004 may include non-volatile memory so that any firmware or other program can be can updated. In the event the interface device 904 loses power, information stored in the flash memory 1004 may be retained. The DRAM 1006 may store various other types of information needed to run the interface device 904, such as all runtime instructions or code. The flash memory 1004 or DRAM 1006 or a combination thereof may include all instructions necessary to communicate with an appliance 950, including all instructions necessary to communicate using the appliance serial protocol disclosed herein.

The interface device 904 further includes a CPU/Radio 1002. The CPU/Radio 1002 can control the operations of the interface device 904. For example, the CPU/Radio 1002 may execute various applications or programs stored in the flash memory 1004 and/or the dynamic random access memory (DRAM) 1006. The CPU/Radio 1002 may also receive input from the appliance 950, interpret the input, and perform one or more functions in response to the input. The CPU/Radio 1002 may further perform all communications functions in order to allow the interface device 904 to communicate with other network devices, one or more gateways, a cloud network, and/or one or more access devices. The interface device 904 may communicate with other devices and/or networks via antenna 1026. For example, antenna 1026 may include a 2.4 GHz antenna that can transmit and receive WiFi communications signals 1028. The antenna 1026 may include other types of antennas that can communicate Bluetooth® signals, Zigbee® signals, Ultra-Wideband (UWB) signals, and/or the like. In some embodiments, the interface device 904 may include multiple antennas for communicating different types of communication signals.

The CPU/Radio 1002 can include at least one universal asynchronous receiver/transmitter (UART) 1010. The CPU/Radio 903 can use the UART 1010 to send and receive serial communications. The CPU/Radio 903 can send data through a transmit line 1022 and a receive data through a receive line 1024. The CPU/Radio 903 can send and receive data through the transmit line 1022 and receive line 1024 using a serial protocol, such as RS232. The CPU/Radio 1002 can also include an input/output (GPIO) line 1014, a restore line 1016, an LED 1 line 1018, and an LED 2 line 1020. The CPU/Radio 1002 can have additional or fewer lines as necessary. The GPIO line 1014 can be used for any suitable function, such as powering an indicator light on an appliance 950 or accepting an input from the appliance 950. A signal sent on the restore line 1016 can be used to restore the CPU/Radio 1002 and/or the interface device 904 to factory defaults. The LED 1 line 1018 and LED 2 line 1020 can be used to power first and second LEDs that can be used to indicate various statuses, such as whether the interface device has a network connection and whether the interface device is powered on.

The interface device 904 further includes a voltage regulator 1008. The voltage regulator 1008 may be used to convert the voltage output from the appliance 950 to a voltage usable by the CPU/Radio 1002. For example, the voltage regulator 1008 may regulate the DC voltage from 5V to 3.3V. The voltage regulator 1008 can be supplied with power from a power line 1030.

Each of the interface lines, including the GPIO line 1014, the restore line 1016, the LED 1 line 1018, the LED 2 line 1020, the transmit line 1022, the receive line 1024, the power line 1030, and any additional lines, can be routed through connector 1012. Connector 1012 can be a proprietary or universal connector. Any appliance 950 to which the interface device 904 is attached through the connector 1012 can have the necessary hardware to make use of the interface lines, such as to provide power to the power line 1030 and to provide the first and second LEDs that are driven by the LED 1 line 1018 and LED 2 line 1020.

In alternate embodiments, some interface lines are not routed through the connector 1012. For example, the power line 1030 can be routed to a power supply attached directly to the interface device 904, and the LED 1 line 1018 and LED 2 line 1020 can be routed to first and second LEDs located within the interface device 904.

In various embodiments, functions may be stored as one or more instructions or code in memory, such as the flash memory 1004 and/or the DRAM 1006. The interface device 904 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1004 and/or the DRAM 1006, may be a processor-readable memory and/or a computer-readable memory that stores software code (programming code, instructions, etc.) configured to cause a processor(s) within the CPU/Radio 1002 to perform the functions described. In other embodiments, one or more of the functions described may be performed in hardware.

A set of these instructions and/or code might be stored on a computer-readable storage medium, such as the flash memory 1004 and/or the DRAM 1006. In some cases, the storage medium might be incorporated within a computer system, such as the CPU/Radio 1002. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 904 and/or might take the form of source and/or installable code, which, upon compilation and/or installation on the interface device 904 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 904 may have other components than those depicted in FIG. 10. Further, the embodiment shown in the figures are only one example of an interface device that may incorporate an embodiment of the invention. In some other embodiments, interface device 904 may have more or fewer components than shown in the figure, may combine two or more components, or may have a different configuration or arrangement of components.

The appliance 950 can have a processor 1034. The processor 1034 can be a microcontroller, such as a Peripheral Interface Controller (PIC). The appliance 950 can include a memory 1036 (e.g., a flash memory or other) that is readable by the processor 1034. The memory 1036 can include instructions enabling the innate functionality of the appliance 950, such as heating and timing for a crock pot.

The appliance 950 can include a user interface 1038. The user interface 1038 can provide buttons, displays, LEDs, knobs, and other input and output elements necessary for a user to interact with the appliance 950. For example, a user interface 1038 for a slow cooker can include a display, a power button, a temperature adjustment button, and a start button. The user interface 1038 can be driven and/or monitored by the processor 1034. In some embodiments, the appliance 950 is "headless" or has no user interface 1038.

The appliance 950 can include a power supply 1040 that can provide power to the voltage regulator 1038 of the interface device 904 through connector 1032, connector 1012, and power line 1030.

The appliance 950 can include an interface device user interface extension 1042. The interface device user interface extension 1042 can include various input and output elements that are passed directly to the interface device 904 without being processed by the processor 1034. Examples of input and output elements of the interface device user interface extension 1042 include LEDs associated with the LED 1 line 1018 and LED 2 line 1020, a hardware restore button associated with the restore line 1016, or any other suitable input/output element.

As noted, a network device may include a network video camera connected to a network, such as network 100, 300, 400 or 500. The network video camera may be configured to capture video images of the physical environment or venue in which the network exists. Users may have privacy concerns when one or more network video cameras are installed in a venue. For example, a user may occasionally turn off a network video camera so that the camera does not record video images. The network video camera may include a light or other indicator that is configured to indicate when recording is or is not in progress, but the lens may still be exposed. When the lens of the camera is exposed, the user or other people in the venue may not be certain that the video camera is not recording. Privacy concerns become even more heightened when network video cameras are installed in a home. As a result of these privacy issues, widespread use of network video cameras may be limited due to users choosing to forego installation of network video cameras in various venues. Accordingly, techniques and systems are described herein for a network video camera that includes a blocking mechanism for blocking one or more lenses in the camera, and/or an indicator device to indicate to a user that the one or more lenses have been blocked. Furthermore, techniques and systems are described for controlling a network video camera that has physical and visible privacy feedback.

Figure 11:
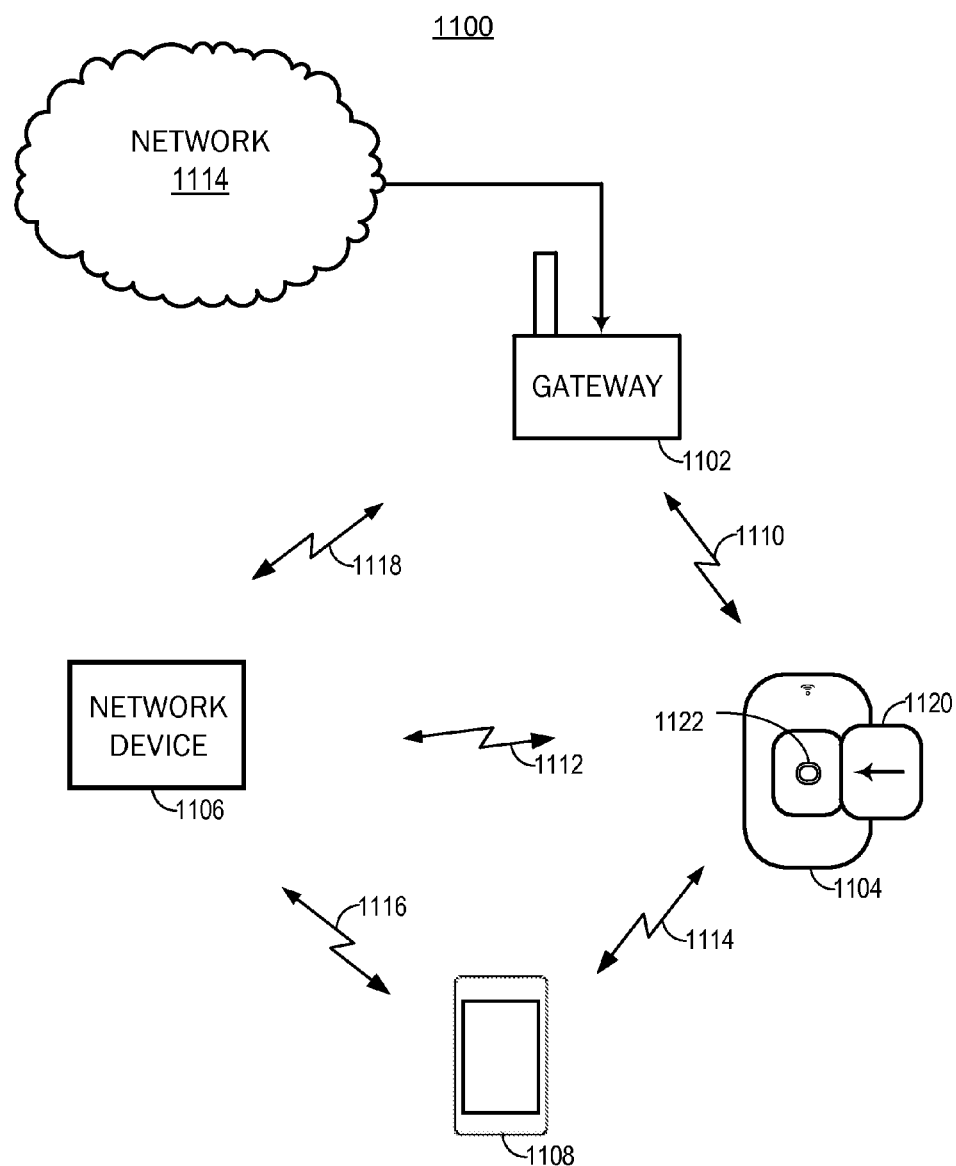
FIG. 11 is illustrates is an illustration of an example of a network environment with a network video camera, in accordance with some embodiments

FIG. 11 illustrates an example of a network 1100 that includes a network video camera 1104, according to embodiments of the present invention. Similar to the local area network 100 described above, the network 1100 also includes a network device 1106, an access device 1108, a gateway 1102, and an external network 1114. The gateway 1102, the network device 1106, the access device 1108, and the external network 1114 may be similar and have the same functionalities and capabilities as the gateway 110 or 112, the network devices 102, 104, or 106, the access device 108, and the external network 114 described above with respect to FIG. 1. The network video camera 1104 may be an IoT (network) device on an IoT network (such as, for example, network 1100 which may be an IoT network). Other network video cameras described herein within embodiments of the present invention may also be IoT (network) devices on one or more IoT networks. It should also be appreciated that the network 1100 may have other components than those depicted. Further, the embodiment shown in the figure is only one example of a network that may incorporate an embodiment of the invention. In some other embodiments, network 1100 may have more or fewer components than shown in the figure, may combine two or more components, or may have a different configuration or arrangement of components. For example, while a certain number of network video cameras, network devices, access devices, and gateways are shown in FIG. 11, one of ordinary skill in the art will appreciate that any number of network devices, access devices, and gateways may be included in the network 1100.

The network video camera 1104 may include any appropriate network video camera that can capture video images and exchange communication signals over a wired or wireless network with other devices connected with any network that the network video camera 1104 is connected to. In some embodiments, the network video camera 1104 may be an IoT device that is able to communicate with other client devices (e.g., network device 1106 and access device 1108) connected to the network 1100 and/or to the external network 1114. The network video camera 1104 can be accessed, controlled, and/or configured directly via an interface of the network video camera 1104 (e.g., an application, a proprietary program, or any other program executed and operated by the network video camera 1104), or remotely using an interface of the network device 1106 or the access device 1108 (e.g., an application, a web browser, a proprietary program, or any other program executed and operated by the network device 1106 or the access device 1108). The network video camera 1104 includes a lens 1122 that is configured to and that may bend light that reflects off of one or more objects in the environment and direct the light into the network video camera 1104. In some embodiments, network video camera 1104 may include multiple lenses, such as the multiple lenses shown in FIG. 26B.

Lens 1122, along with other lenses shown herein, may be fixed or adjusted at a certain angle so that the camera may capture a more favorable portion of its environment. For example, if the camera is mounted high up in a room, then the lens may be angled downwards (e.g., at an angle of 10 degrees downward) so that the lens(es) may view a greater portion of the lower portion of the room (whereas if the lens(es) were pointed directly straight, it may only capture a portion of the room or may capture an undesirable amount of a ceiling or wall).

The network video camera may also include a blocking mechanism 1120. The blocking mechanism 1120 of the network video camera 1104 can be controlled to selectively block a lens 1122 from capturing video images. The blocking mechanism 1120 is a visible object that provides visible and physical feedback that the lens 1122 is clearly blocked from capturing video images. FIG. 11 shows the network video camera 1104 with the blocking mechanism 1420 deactivated such that it is not blocking the lens 1122 from capturing video images. However, as shown by the arrow within blocking mechanism 1120, blocking mechanism 1120 may move across lens 1122 to block lens 1122. Blocking mechanism 1120 may move in any direction to block, or unblock, lens 1122. The blocking mechanism 1120 may also be a virtual blocking mechanism and not a physical device that blocks lens 1122. For example, such a virtual blocking mechanism may include an electronic status of the lens (e.g. that the lens is off), which may be viewed and/or controlled by a user remotely. While a single blocking mechanism 1120 is shown in FIG. 11, more than one blocking mechanism may be used in some embodiments.

The network video camera 1104 may be in communication with the gateway 1102 to access other devices or networks. For example, the gateway 1102 and the network video camera 1104 may communicate using signal 1110. The gateway 1102 may provide the network video camera 1104 with access to the external network 1114, which may include the Internet, a public or private cloud network, or another wide area network. In some embodiments, the network video camera 1104 may include or be in communication with a local storage device (not shown) that can store video data. For example, the network video camera 1104 may be built with an internal local storage device that can store the video data. In another example, the network video camera 1104 may store video data on a storage device that is within the network 1100, but that is not part of the network video camera 1104. The network video camera 1104 may transmit the video data to the storage device within the network 1100. In some embodiments, the network video camera 1104 may also transmit video images to the external network 1114 via the gateway 1102 or using a broadband network connection in embodiments in which the camera 1104 has a broadband transceiver radio. For example, the network 1114 may include a proprietary cloud service that allows a user of the network video camera 1104 to store a certain amount of video data. The user may be subscribed or registered with the proprietary cloud service. The user may pay a service fee to an operator of the cloud service for storing the user's video data. In some embodiments, the video data may be transmitted to the external network 1114 as video images are captured. In some embodiments, the video data may be transmitted to the network 1114 once the local storage reaches a storage limit (e.g., 500 MB, 750 MB, 1 GB, 2 GB, 3 GB, 5 GB, or any other storage limit). In some examples, the network video camera 1104 may transmit video data (e.g., as images are captured, once a storage limit is reached, or the like) to a local storage device that is not part of the camera 1104 but that is within the network 1100, and the video data may then be transmitted to the external network 1114. In some embodiments, a user may be required to authorize transfer of video data from the network video camera 1104 to the network 1114 before the video data is transmitted to the network 1114. For example, a prompt may be displayed to the user before the video data is transmitted to the network 1114. The prompt may be displayed on a display (not shown) of the network video camera 1104, on a display (not shown) of the network device 1106, and/or on a display of the access device 1108. The prompt may include a button or other selection that the user is required to affirm before the video data is transmitted.

The network video camera 1104 may exchange communications with the network device 1106 (e.g., via signal 1112) and the access device 1108 (e.g., via signal 1114). The access device 1108 and the network device 1106 may also be in communication with one another (e.g., via signal 1116). A user may access, control, and/or configure the network device 1106 and the network video camera 1104 using the access device 1108. The user may interact with the network device 1106 and the network video camera 1104 using an application, a web browser, a proprietary program, or any other program executed and operated by the access device 1108. The network video camera 1104, the network device 1106, and the access device 1108 may exchange communications directly using Zigbee™ signals, Bluetooth™ signals, WiFi™ signals, infrared (IR) signals, UWB signals, WiFi-Direct signals, BLE signals, sound frequency signals, or any other available communication protocol that allows direct communication between devices. The network video camera 1104, the network device 1106, and the access device 1108 may also exchange communications through the gateway 1102 and/or through the external network 1114. For example, the network device 1106 may transmit signal 1118 to gateway 1102 with a message for the network video camera 1104, and the gateway 1102 may route the message to the network video camera 1104 using signal 1110. The network 1100 may be accessed using the external network 1114 when a user of the access device 1108 is located remotely from the network 1100. For example, a signal may be transmitted from the access device 1108 to the network 1114, from the network 1114 to the gateway 1102, and then from the gateway 1102 to the network device 1106, the network video camera 1104, or to another device on the network 1100. In some embodiments, the external network 1114 may be used to access network 1100 even when a user is located locally to the network 1100. For example, the user may use a cellular or other broadband network to access devices on the network 1100.

The network video camera 1104 may also include a shutter (not shown) between the lens 1122 and a local storage device (not shown). The shutter is configured to and may open to allow the light to reach the storage device. The shutter may then close once the light has been captured. The storage device may include any device that can record the light as one or more video images. For example, the storage device may include a digital storage device, film, or any other appropriate storage device. In the event a digital storage device is used, an electrical device or sensor may generate an electrical charge according to an amount of light being received. The charge may be interpreted by a processor or other set of computer components to process the received image. For example, a sensor may be separated into pixels, and each pixel's charge may be recorded and interpreted. The resulting video images may then be recorded in the local storage device or transmitted to one or more remote storage devices on the network 1114. In some embodiments, the network video camera 1104 may include one or more infrared (IR) blasters for sending IR commands to one or more devices.

Figure 12:
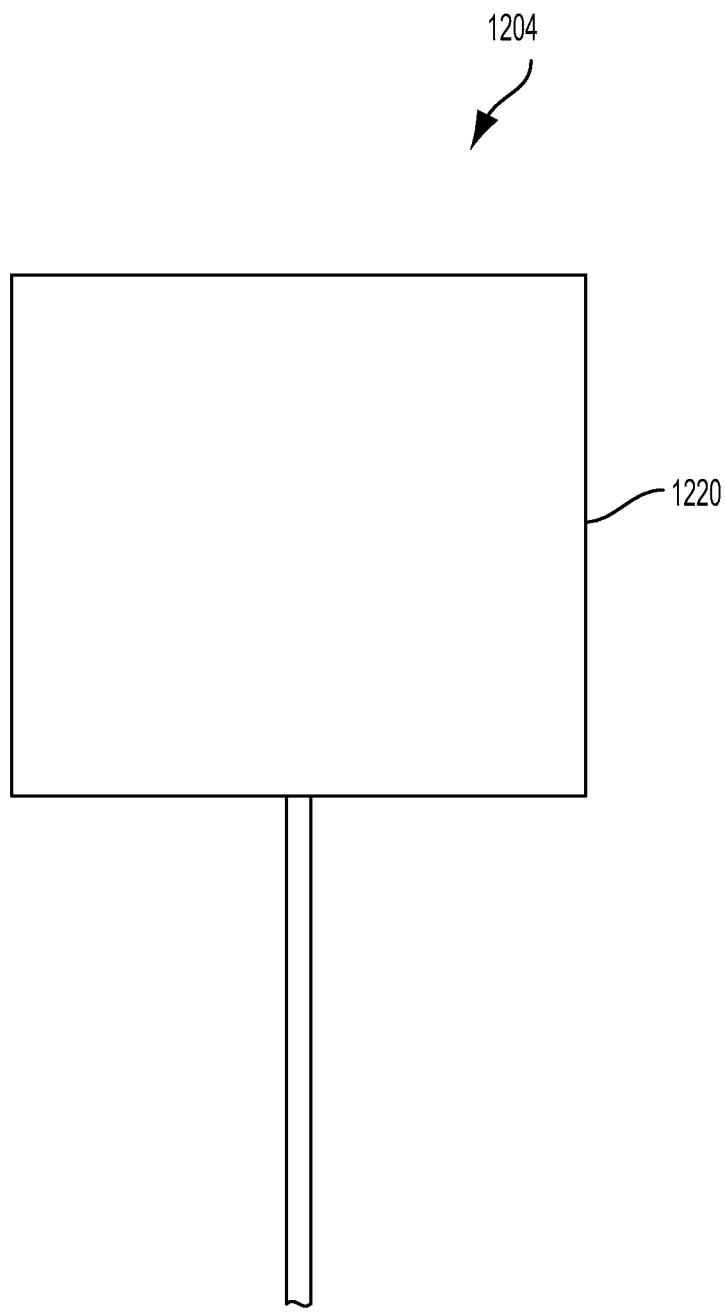
FIG. 12 illustrates an example of a network video camera, in accordance with some embodiments.
Figure 13:
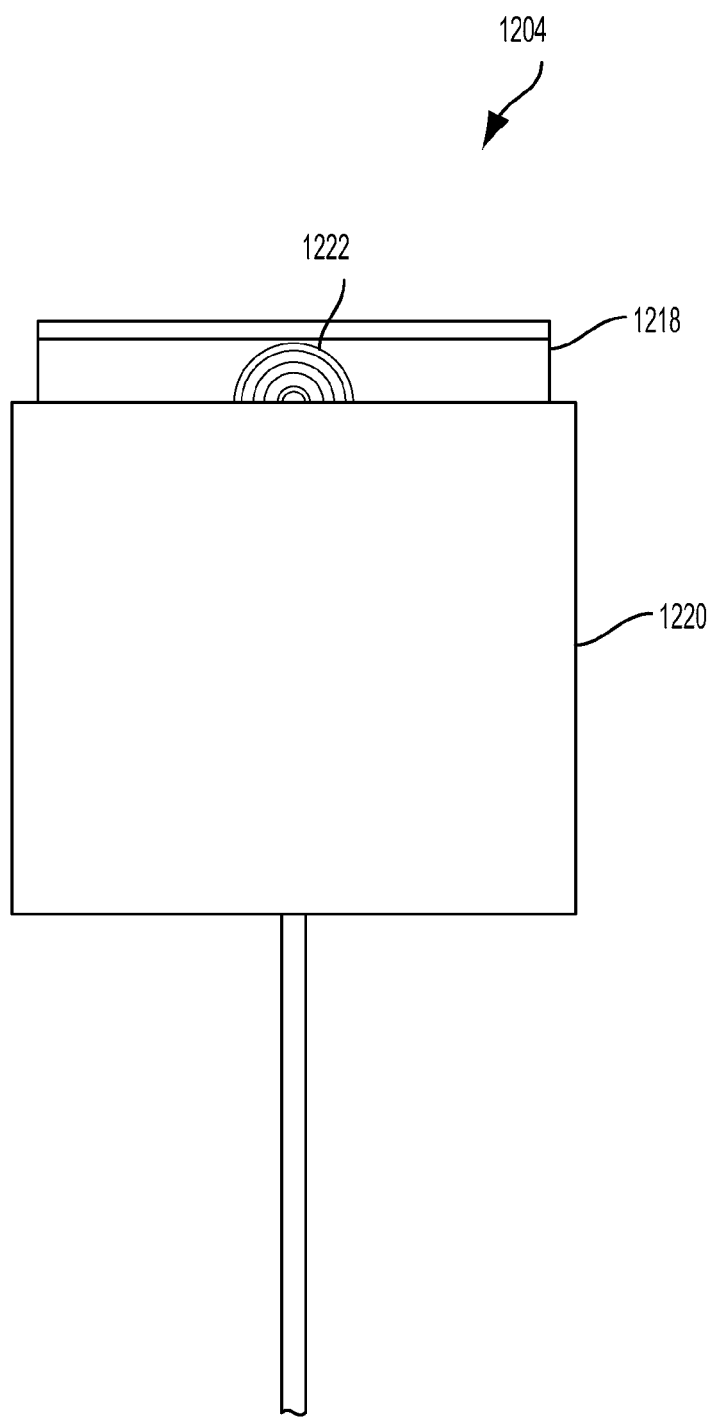
FIG. 13 illustrates an example of a network video camera, in accordance with some embodiments.
Figure 14:
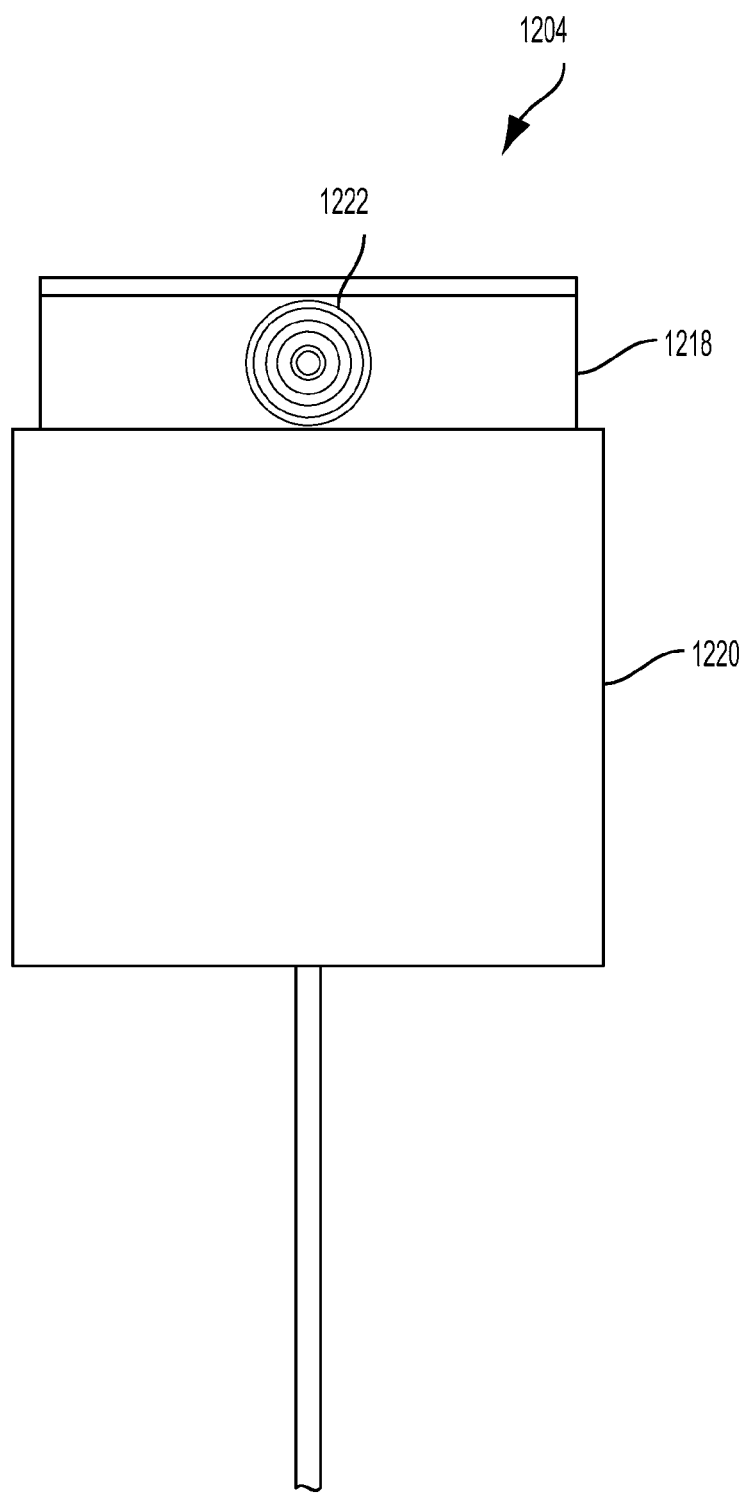
FIG. 14 illustrates an example of a network video camera, in accordance with some embodiments.

FIGS. 12, 13 and 14 illustrate an example of a network video camera 1204, according to embodiments of the present invention. Network video camera 1204 includes a lens 1222, a housing 1218, and an outer shell, outer casing or outer housing 1220. The lens 1222 may be positioned within housing 1218. FIG. 12 shows a view of network video camera 1204 with positioned fully inside outer housing 1220. FIG. 13 shows a view of network video camera 1204 with network video camera 1204 and housing 1218 partially protruding out from (an opening in the top of) outer housing 1220. FIG. 14 shows a view of network video camera 1204 with network video camera 1204 and housing 1218 fully protruding out from (an opening in the top of) outer housing 1220. It should be appreciated that the video camera 1204 may have other components than those depicted. Further, the embodiment shown in the figure is only one example of a video camera that may incorporate an embodiment of the invention. In some other embodiments, video camera 104 may have more or fewer components than shown in the figure, may combine two or more components, or may have a different configuration or arrangement of components.

As shown by the progression of the views of network video camera 1204 from FIG. 12 to FIG. 13 to FIG. 14, housing 1218, which houses lens 1222, may be connected to outer shell 1220 such that housing 1218 is configured to slide out of outer shell 1220. More specifically, the casing/shell 1220 or the lens 1222 can be moved so that the blocking mechanism 1220 covers the lens 1222. For example, the shell/casing itself may be movable, and can be moved to cover the lens 1222. In another example, the casing is stationary, and the camera 1204 or the lens 1222 may be moved so that the lens 1222 is covered by the casing. While housing 1218 is in the process of sliding out of outer shell 1220 and after housing 1218 has slid out of outer shell 1220, lens 1222 may be partially or wholly visible, as shown in FIGS. 13 and 14. Lens 1222 may be partially or wholly visible because lens 1222 is, after housing 1218 has partially or wholly slid out of outer shell 1220, no longer fully covered up or blocked by outer shell 1220. As such, outer housing 1220 may serve double duty and also act as a blocking mechanism that blocks part or all of lens 1222.

The blocking mechanism may come in a variety of other forms. In some examples, the blocking mechanism may be a movable piece of material separate from the casing that can be moved back and forth to cover the lens. In some examples, the blocking mechanism may be built into the lens. For example, the lens may include a material that changes its light transmission properties (e.g., turns opaque, translucent, or clear depending on the material) when a current, voltage, or heat is applied to the material. In one example, a current or voltage may be applied to the lens that may prevent the network video camera from capturing video images. In another example, a current or voltage may be applied to the lens that may allow the network video camera to capture video images. The material may include an electro-chromic material, a thermo-chromic material, a photo-chromic material, a suspended particle type of material, a micro-blind material, or a liquid crystal device. In some embodiments, the blocking mechanism may include a combination of the examples described herein. One of ordinary skill in the art will appreciate that the blocking mechanism may include any suitable physical and visible object for covering the lens. Several of such other types of network video cameras, including blocking mechanisms, are described in FIGS. 15-29.

The blocking mechanism 1220 of the network video camera 1204 can be controlled to selectively block a lens 1222 from capturing video images. The blocking mechanism 1220 is a visible object that provides visible and physical feedback that the lens 1222 is clearly blocked from capturing video images. FIG. 12 shows the network video camera 1204 with the blocking mechanism 1220 activated to block the lens 1222 from capturing video images. While a single blocking mechanism 1220 is shown in FIGS. 12, 13 and 14, more than one blocking mechanism may be used in some embodiments. For example, another network video camera, such as the video camera shown in FIG. 28, may include multiple lenses. In some embodiments of the present invention, a separate blocking mechanism may be used to block each lens. In some embodiments, a single blocking mechanism may be used to block more than one lens of a network video camera. By using one or more blocking mechanisms to block one or more lenses of the network video camera 1204, people in the environment or venue where the network 1200 exists can be certain that the network video camera 1204 is not recording when recording is not desired. Furthermore, other devices that are a part of or connected to network video camera 1204 may also be blocked or covered by blocking mechanism 1220. For example, a microphone, light, or other device may be blocked by blocking mechanism 1220 such that the microphone, light, etc. are deactivated or less functional because of the blocking mechanism.

In some embodiments, the blocking mechanism 1220 and the recording state of the network video camera 1204 may operate in conjunction with one another. In some examples, the blocking mechanism 1220 may be activated or deactivated in response to the recording state of the network video camera 1204. For example, the blocking mechanism 1220 may be activated when the network video camera 1204 is instructed to stop recording, and may be deactivated when the network video camera 1204 is instructed to record. In some examples, the recording state of the network video camera 1204 may be set based on the state of the blocking mechanism 1220. For example, the network video camera 1204 may automatically record when the blocking mechanism 1220 is deactivated, and may automatically stop recording when the blocking mechanism 1220 is activated. In some embodiments, the blocking mechanism 1220 and the recording state of the network video camera 1204 may operate independently of one another. For example, the blocking mechanism 1220 may be controlled separately from the network video camera 1204 so that the lens 1222 is not always blocked by the blocking mechanism 1220 when the network video camera 1204 is not recording.

The blocking mechanism 1220 may be controlled using any appropriate controlling device. For example, the blocking mechanism 1220 may be controlled using a motor (e.g., servo-motor, an electromagnetic motor, or the like), a spring with a latch (e.g., a magnetic latch), one or more metal plates that contract upon being electrically charged, a combination thereof, or any other appropriate means by which the blocking mechanism 1220 can be moved.

As noted, a network video camera according to embodiments of the present invention, such as network video camera 1204, may include a storage device (e.g. memory). The storage device may be used to store a program or instructions for a processor within the network video camera to control the blocking mechanism. For example, the storage device may store a predetermined and/or customizable setting configured to control how and/or when the blocking mechanism interacts with the lens and/or the rest of the network video camera. For example, the settings or instructions may include certain times of day for the blocking mechanism to activate and cover the lens. The settings or instructions may also be conditional such that they are based on certain events detected by the lens of the network video camera or other devices within the video camera. Various examples of such events are described herein.

In some embodiments, the blocking mechanism 1220 may be manually controlled. For example, the blocking mechanism 1220 may be configured so that a user can physically push, pull, slide, or otherwise manipulate the blocking mechanism 1220 to block and unblock the lens 1222. In some embodiments, the user may also manually turn on or off recording by the network video camera 1204 when blocking or unblocking the lens 1222. For example, the user may push one or more physical buttons on the network video camera 1204 or virtual buttons (e.g., on a display of the network video camera 1204) to turn recording by the network video camera 1204 on and off. In some embodiments, the network video camera 1220 may automatically stop recording when the blocking mechanism 1220 is manually activated, or may automatically begin recording when the blocking mechanism 1220 is deactivated.

In some embodiments, various events may be detected that cause the network video camera 1204 to not record and activate the blocking mechanism 1220 to block the lens 1222, as well as events that cause the network video camera 1204 to record and that deactivate the blocking mechanism 1220 to unblock the lens 1222. As previously noted, in some embodiments, the blocking mechanism 1220 and the recording state of the network video camera 1204 may operate in conjunction with one another, and thus a detected event may cause the blocking mechanism 1220 and the recording state of the network video camera 1204 to change in parallel. In some embodiments, a detected event may only control operation of the blocking mechanism 1220 or may only change the recording state of the network video camera 1204. For example, the blocking mechanism may be deactivated such that the lens is uncovered, and at the same time the lens may or may not be utilized for viewing by a user. For example, a user may be viewing the environment near the lens, or the user may be not viewing the environment near the lens because the shutter within (internal or external) the camera may have been deactivated. Furthermore, if the blocking mechanism is deactivated and the lens is viewing the environment near the lens, the camera may or may not be recording that environment. For example, a user may be viewing or streaming the environment live at a remote location and not recording.

In some embodiments, events that control the blocking mechanism 1220 and/or the recording state of the network video camera 1204 may require user input or interaction with the network video camera 1204 before the recording state changes or before the blocking mechanism 1220 is activated or deactivated. For example, the network video camera 1204 may include one or more physical buttons on the network video camera 1204 and/or one or more virtual buttons (e.g., on a display of the network video camera 1204) that allow a user to activate and deactivate the blocking mechanism 1220 and/or to cause the network video camera 1204 to record or not record. Upon a physical or virtual button designated for the blocking mechanism 1220 being pushed or otherwise selected, a signal may be sent to a controller of the network video camera 1204 that causes activation or deactivation of the blocking mechanism 1220. A physical or virtual button may also be designated for recording, and once the button is pushed a signal may be sent to the controller to cause the network video camera 1204 to record or not record. As another example, the network video camera 1204 may include a voice recognition program that recognizes one or more users' voices. A user may issue voice commands that cause the network video camera 1204 to record or not record, and that cause the blocking mechanism 1220 to block or unblock the lens 1222. In some embodiments, a voice command must be from an authorized user that has programmed or trained the voice recognition program to recognize the authorized user's voice. Other inputs may also be used for authenticating a user to allow the user to control the blocking mechanism 1220 and the recording state of the network video camera 1204, such as face recognition, biometric input (e.g., fingerprint recognition, iris recognition, blood vessel recognition using IR sensors, or the like), gait analysis, or other appropriate input. Other types of recognition, such as gesture recognition (e.g. waiving of a hand or other body part) may be implemented into network video camera 1204 similarly to voice recognition. Other types of virtual buttons, such as tact or capacitive, may also be utilized.

As such, network video camera 1204, or other embodiments of network video cameras described herein, may include or be attached to such devices. For example, one such device may be a fingerprint reader. Therefore, an input into the network video camera may include fingerprint data received via the fingerprint reader, in which case the network video camera may include a program to process the received fingerprint data to determine whether it matches stored fingerprint data of the owner. In another example embodiment, the network video camera may also include one or more infrared (IR) sensors that can detect motion in the IR frequency spectrum by detecting changes in IR energy as an object moves. The IR sensors can detect motion even in cases when the blocking mechanism covers the IR sensors.

In some embodiments, events may be detected that cause a change in the recording state of the network video camera 1204 and/or that cause activation or deactivation of the blocking mechanism 1220 to occur without requiring any user input or interaction. In some examples, the network video camera 1204 may be set to a recording state (to record or to not record) and a corresponding blocking mechanism 1220 position under certain conditions, and detection of an occurrence of an event may cause the network video camera 1204 to change recording states and to activate or deactivate the blocking mechanism 1220. For example, when the venue in which the network exists is a user's home, a default mode may be set that causes the network video camera 1204 to not record and the blocking mechanism 1220 to prevent the network video camera 1204 from recording when an authorized or predefined user is located within the home. In another example, the venue in which the network exists may be a business, and a default mode may be set that causes the network video camera 1204 to record and the blocking mechanism 1220 to allow the network video camera 1204 to record at all times unless a specific event is detected.

There are various examples of events that can cause a change in recording state and a change in position of the blocking mechanism 1220. In one example, the network video camera 204 may be set to not record and to activate the blocking mechanism 220, and detection of various events may trigger deactivation of the blocking mechanism 220 to allow the network video camera 204 to record and may also trigger the network video camera 204 to start recording. The venue for the network 200 may be a home, and the network video camera 204 may be set to not record when an owner is present within the home. The owner's presence may be determined by a user input into the device, communication with an access device that can detect the user's presence, capturing and analysis (e.g. facial recognition) of an image of the owner (or another person, animal or thing) in the home, sensing basic motion (e.g. if the camera acts as a motion sensor, such as, for example, when the blocking mechanism is covering the lens), among others. When motion sensor data is obtained indicating that motion is detected in the home, the network video camera 1204 may temporarily deactivate the blocking mechanism 1220 to allow the network video camera 1204 to capture an image of the subject. Once the image is captured, the network video camera 1204 may activate the blocking mechanism 1220.

An example of a detected event by the network video camera 1204 may also include detection of an occurrence of an emergency event. In response to detecting an emergency event, one or more processors of the network video camera 1204 may cause the blocking mechanism 1220 to deactivate and unblock the lens 1222 and may cause the network video camera 1204 to start recording. There are a variety of different examples of emergency events that may cause the video camera 1204 to record.

An example of an emergency event includes a window sensor being triggered, indicating that a window has been broken or unexpectedly opened, or an irregular or loud noise (e.g. gunshot, alarm system alarm, etc.). Window sensors may detect a broken or open window based on separation of magnets between two pieces of the sensors, based on a breach or shut-off of a light beam between two pieces of the sensors, based on a force on the sensors (e.g., a vibration or shatter of the glass), based on a sound of glass shattering, or any other appropriate technique. Therefore, such a window sensor may be either a part of or externally connected to network video camera 1204, and may send communications to network video camera 1204 after such an emergency event is detected. The window sensor may be or include an audio recording device or any other device that detects/listens to audio such as glass breaking.

Another example of an emergency event may include detection of motion when motion is not expected. As noted, the network video camera 1204 may operate as a motion sensing device when the blocking mechanism 1220 is covering the lens, and the motion sensing device may detect motion at a time when it doesn't expect to detect motion, such as when the owner(s) are at work and/or school. Therefore, such a motion sensor may be a part of network video camera 1204, and may send communications to network video camera 1204 after such an emergency event is detected. A separate external motion sensor may be connected to the network video camera 1204. The sensor may be able to detect an unauthorized person (or animal) in the home. For example, the sensor may be able to detect a person (e.g. adult or baby) or animal using facial recognition, analysis of the build/weight of a detected person, or other characteristics. The sensor and/or a processor communicating with the sensor may be able to compare data/statistics regarding these characteristics with those of data/statistics stored for people authorized/expected to be in the home.

Another example of an emergency event may include the vital statistics of a user/owner falling below or goes above certain levels. For example, the person may wear, carry, or be in contact with a device that gathers the person's vital statistics, such as pulse (or heart rate), blood pressure, temperature, respiratory rate, or any other relevant statistic. Various types of electronic wearable devices may gather the vital statistics and share the statistics with the network video camera 1204. Electronic wearable devices may include a smart watch, an electronic bracelet, a smart necklace, a smart adhesive device, an earpiece, a pair of smart glasses, or any other device that can measure pulse, heart rate, temperature, respiratory rate, or other relevant statistics. In some embodiments, the electronic device (that is internal or external to the network video camera) may transmit a signal to the network video camera 1204 in the event any of the vital statistics fall below or go above a predetermined level. In some embodiments, the electronic device may stream measurements of the user's vital statistics to the network video camera 1204 so that the network video camera 1204 can determine when the statistics fall below or go above the threshold level (e.g. representing a problem with the person, or that the person is sleeping). The sensor may also be able to determine the status/health of a baby, or another person based on the age/condition of the person. The vitals may be tracked over time so that it may determine when the vitals change drastically in a short period of time.

Another example of an emergency event may include the sounding of an alarm signaling an emergency, power outage, earthquake, flood, etc. The network video camera 1204 may receive signals from other electronic devices, such as a smoke detector, a burglar alarm, a breaker box (power), moisture detector, or other detection device, that can alert the network video camera 1204 of the emergency event.

Other types of sensors that may be used in conjunction with the network video camera, whether in emergency event situations or otherwise, are accelerometers, light sensors, temperature sensors, humidity sensors, and the like.

As noted, network video cameras and blocking mechanisms according to embodiments of the present invention may come in a variety of forms. As shown in FIG. 12, the lens may be part of an interior housing that slides in and out of an exterior housing or casing such that the exterior casing acts as a blocking mechanism. However, a variety of other types of network video cameras and blocking mechanisms are described within embodiments of the present invention. For example, the blocking mechanism may be a movable piece of material separate from the casing that can be moved back and forth to cover the lens. In some examples, the blocking mechanism may be built into the lens. For example, the blocking mechanism may be created (e.g. virtually) using the optics of the lens instead of a physical blocking mechanism that covers the lens. For example, the blocking mechanism may be a part of the optical lens, IR shutter, etc. Several different embodiments of network video cameras and blocking mechanisms are described with respect to FIGS. 15-28.

Figure 15B:
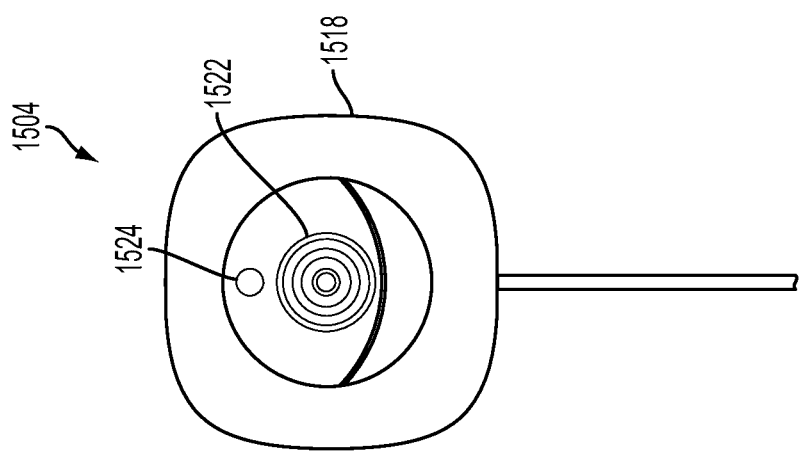
FIG. 15B illustrates an example of a network video camera, in accordance with some embodiments.
Figure 15A:
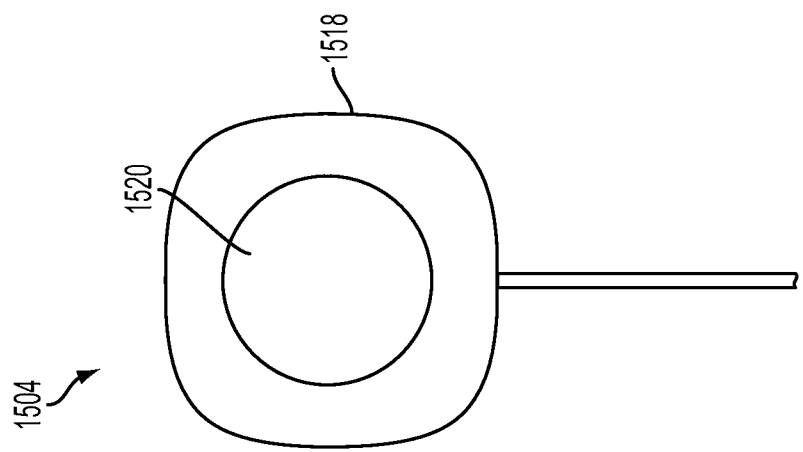
FIG. 15A illustrates an example of a network video camera, in accordance with some embodiments.

FIGS. 15A and 15B illustrate an example of a network video camera 1504, according to embodiments of the present invention. Network video camera 1504 includes a lens 1522, a housing 1518, and a blocking mechanism 1220. As shown in FIG. 15B, the lens 1522 may be positioned within housing 1518. FIG. 15A shows a view of network video camera 1504 with lens 1522 fully covered or blocked by blocking mechanism 1520. FIG. 15B shows a view of network video camera 1504 with lens 1522 fully exposed and not covered by blocking mechanism 1520.

As shown by the progression of the views of network video camera 1504 from FIG. 15A to FIG. 15B, blocking mechanism 1520 may cover lens 1522 in a very short amount of time. In some embodiments, blocking mechanism 1520 may gradually cover lens 1522, as shown, for example, in FIGS. 16A-16C. However, blocking mechanism 1520 may also cover lens 1522 instantly without any progression, as shown in FIGS. 15A-15B. In other words, the lens 1522 may be immediately covered, in full, by blocking mechanism 1520, such that no part of the lens is covered at an earlier time or a later time than any other part of the lens. After the network video camera 1504 receives an indication that the video camera should be covered, network video camera 1504 may immediately cover lens 1522 with blocking mechanism 1520. Such a blocking mechanism 1520 may be in the form of a filter material (e.g., polymer, plastic, or other appropriate material) that may be adjusted very quickly to prevent light (and therefore video) from being seen or captured by lens 1522. For example, the lens 1220 may include a material that changes its light transmission properties (e.g., turns opaque, translucent, or clear depending on the material) when a current, voltage, or heat is applied to the material. Alternatively, blocking mechanism 1520 may be in the form of a part of the lens 1522. For example, blocking mechanism 1520 may be in the form of a change in color (or another similar differentiating aesthetic, such as texture, etc.) of the lens from a lighter color to a darker color. The darker color may prevent the lens from seeing/receiving some or all of the light required to capture an image in front of it. More specifically, the lens 1522 may change color from clear to black. Other variations of the lens may contribute to a similar result, including variations in polarization, gradation, mirroring, and materials, among others.

Network video camera 1504 also includes an indication device 1524. Indication device 1524 may provide an indication or notification to someone, or something, in the physical environment or venue in which the network exists (e.g. in the vicinity of the network video camera 1504) that the lens 1522 of network video camera 1504 is being closed/covered or opened/uncovered. As noted, users may have privacy concerns when one or more network video cameras are installed in a venue. To assist the user in knowing when the camera is uncovered and capturing images in the environment of the user, indication device 1524 may provide an indication that blocking mechanism 1520 has been deactivated and therefore lens 1522 has been uncovered, allowing network video camera 1504 to view, capture and/or record a scene taking place in its line of sight. Alternatively, indication device 1524 may provide an indication that blocking mechanism 1520 has been activated and therefore lens 1522 has been covered, preventing network video camera 1504 to view, capture and/or record a scene taking place in its line of sight.

Indication device 1524 may come in many forms. For example, indication device 1524 may include an LED light that turns on when the lens has been activated. Similarly, in such an embodiment, a user may see an indication that the lens has been deactivated if the LED light turns off. In alternative embodiments, indication device 1524 may include an electronic display. For example, indication device 1524 may include a graphic user interface that allows a user to interact with the display. The indication device 1524 may include a touch screen user interface, or may include physical buttons. The indication device 1524, including an electronic display, may present words (e.g. "camera on"), symbols (e.g. a camera or recording symbol), or other indications to the user to tell the user that the camera is viewing its environment. In alternative embodiments, the indication device 1524 may include an indication integrated with blocking mechanism 1520. For example, the outside (i.e. facing the user and visible from the outside of the network video camera 1504) of blocking mechanism may include a color scheme, text or another notification indicating that the lens has been covered. For example, the blocking mechanism 1520 may be colored red so that the user knows whether the lens is activated based on whether the user sees the red blocking mechanism. Alternatively, the blocking mechanism, or another component of the network video camera, may also make a sound to indicate a status change of the camera.

The indication device 1524 may work in conjunction with different portions of the network video camera 1504 so as to allow the indication device 1524 to know when to turn on and off, or when to notify the user that the lens has been activated or deactivated. For example, the indication device 1524 may be communicatively connected to a processor within the network video camera 1504 such that the processor of video camera 1504 can transmit a communication to the indication device 1524 including an indication that the lens is or will be activated. Such a communication may cause the indication device 1524 to turn on. Alternatively, the processor of video camera 1504 can transmit a control communication to the indication device 1524 causing the indication device 1524 to turn on without any further actions by the indication device 1524.

Figure 16C:
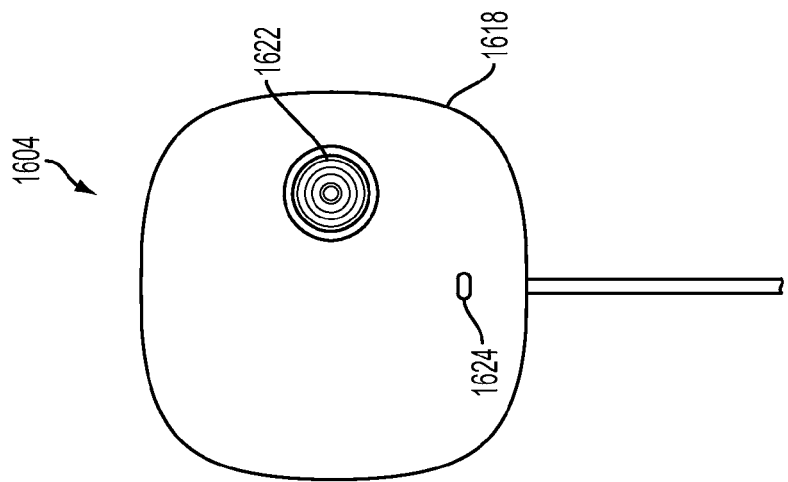
FIG. 16C illustrates an example of a network video camera, in accordance with some embodiments.
Figure 16B:
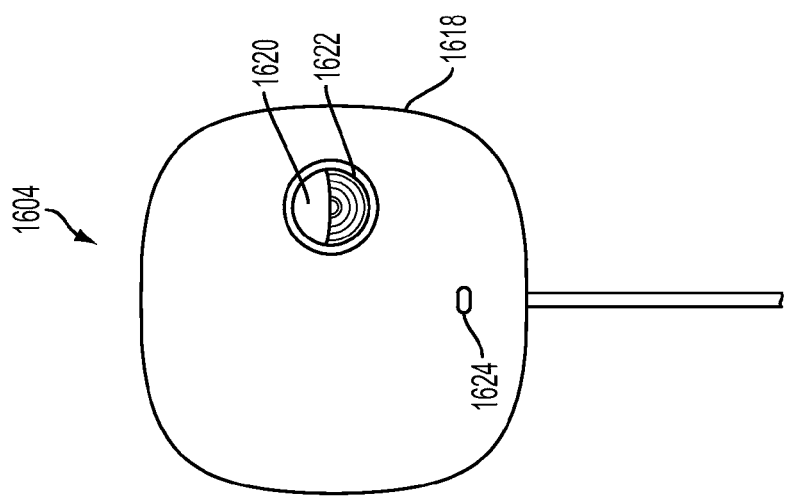
FIG. 16B illustrates an example of a network video camera, in accordance with some embodiments.
Figure 16A:
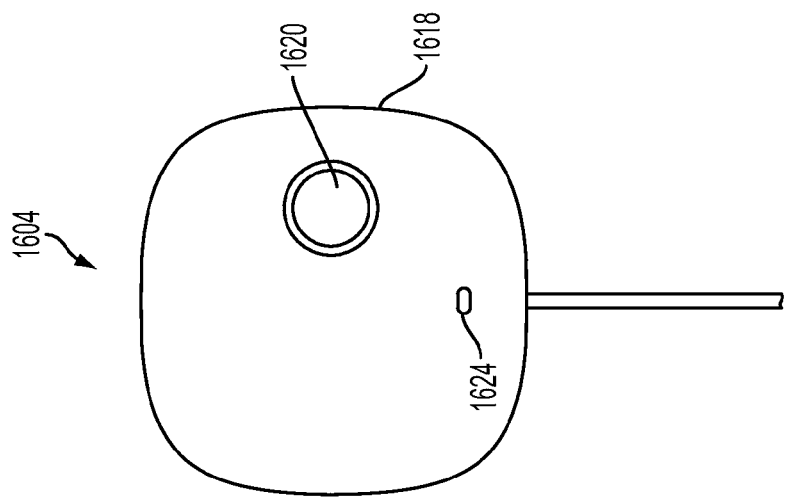
FIG. 16A illustrates an example of a network video camera, in accordance with some embodiments.

FIGS. 16A, 16B and 16C illustrate an example of a network video camera 1604, according to embodiments of the present invention. Network video camera 1604 includes a lens 1622, a housing 1618, a blocking mechanism 1620, and an indication device 1624. As shown in FIGS. 16B and 16C, the lens 1622 may be positioned within housing 1618. FIG. 16A shows a view of network video camera 1604 with lens 1622 fully covered or blocked by blocking mechanism 1620. FIG. 16B shows a view of network video camera 1604 with lens 1622 partially exposed and partially covered by blocking mechanism 1620. FIG. 16C shows a view of network video camera 1604 with lens 1622 fully exposed and not covered by blocking mechanism 1620.

As shown by the progression of the views of network video camera 1604 from FIG. 16A to FIG. 16B to FIG. 16C, blocking mechanism 1620 may cover lens 1622 gradually over a period of time. More specifically, the blocking mechanism 1620 can be moved so that the blocking mechanism 1620 covers the lens 1622. While blocking mechanism 1620 is in the process of sliding over lens 1622, lens 1622 may be partially or wholly visible, as shown in FIGS. 16B and 16C. Lens 1622 may be partially or wholly visible because lens 1622 is, after blocking mechanism 1620 has partially or wholly slid from the top of lens 1622, lens 1622 is no longer fully covered up or blocked by outer shell 1620.

Similar to blocking mechanism 1520 in FIGS. 15A-15B, blocking mechanism 1620 may come in many different forms. Blocking mechanism 1620 may be in the form of a stand-alone device or may be a part of lens 1622. For example, blocking mechanism 1620 may be a solid material and moves from a position inside housing 1618 but not covering lens 1622 to a position at least partially covering lens 1622. Blocking mechanism 1620 may also be in the form of a filter material (e.g., polymer, plastic, or other appropriate material) that may be adjusted very quickly to prevent light (and therefore video) from being seen or captured by lens 1622. For example, the lens 1620 may include a material that changes its light transmission properties (e.g., turns opaque, translucent, or clear depending on the material) when a current, voltage, or heat is applied to the material. Alternatively, blocking mechanism 1620 may be in the form of a part of the lens 1622. Blocking mechanism 1620 may also include a device of many different shapes and sizes. For example, as shown in FIGS. 16A-16C, blocking mechanism 1620 may be the same shape and size as lens 1622. Alternatively, as will be described further with respect to FIGS. 17-21, blocking mechanism 1520 may be a different shape and size than the lens it is configured to cover.

Similar to indication device 1524 in FIG. 15, indication device 1624 may come in a variety of different forms. For example, indication device 1624 may be in the form of any indication device 1224 described with respect to FIG. 12. For example, indication device 1624 may be a stand-alone device, such as an LED. Furthermore, indication device 1624 may be represented by a colored or lit up (or another similar differentiating aesthetic, such as texture, etc.) portion of blocking mechanism 1620. For example, blocking mechanism 1620 may be a different color than the housing 1618 so that when blocking mechanism 1620 moves from within housing 1618 to cover at least a part of lens 1622, the color (or other aesthetic) from blocking mechanism 1620 indicates to a user that a portion of lens 1622 is being blocked by blocking mechanism 1620. A combined blocking mechanism 1620 and indication device 1624 may also indicate to a user what portion of the lens has been covered by blocking mechanism 1620 based on how much of the colored portion (e.g. all) of blocking mechanism 1620 the user sees.

FIGS. 17A, 17B and 17C illustrate an example of a network video camera 1704, according to embodiments of the present invention. Network video camera 1704 includes a lens 1722, a housing 1718, and a blocking mechanism 1720. As shown in FIGS. 17B and 17C, the lens 1722 may be positioned within housing 1718. FIG. 17A shows a view of network video camera 1704 with lens 1722 fully covered or blocked by blocking mechanism 1720. FIG. 17B shows a view of network video camera 1704 with lens 1722 partially exposed and partially covered by blocking mechanism 1720. FIG. 17C shows a view of network video camera 1704 with lens 1722 fully exposed and not covered by blocking mechanism 1720.

As shown by FIGS. 17B and 17C, blocking mechanism 1720 may be made up of two different portions of the device. More specifically, blocking mechanism 1720 may be made up of two portions of a device that are close to each other or touching each other when covering lens 1722, but that separate over time as the blocking mechanism 1720 is activated (and lens 1722 is activated and exposed). The two portions of blocking mechanism 1720 may, as shown in FIGS. 17B and 17C, each make up one-half of the whole blocking mechanism 1720. However, other portion sizes are also possible. Furthermore, blocking mechanism 1720 is approximately the same width as housing 1718, but may be smaller or larger depending on the embodiment. More generally, blocking mechanism 1720 may be any size or shape of device that in certain positions blocks, and in other positions exposes, lens 1722.

As shown by the progression of the views of network video camera 1704 from FIG. 17A to FIG. 17B to FIG. 17C, blocking mechanism 1720 may cover lens 1722 gradually over a period of time. More specifically, the blocking mechanism 1720 can be moved so that the blocking mechanism 1720 covers the lens 1722. While blocking mechanism 1720 is in the process of sliding over lens 1722, lens 1722 may be partially or wholly visible, as shown in FIGS. 17B and 17C. Lens 1722 may be partially or wholly visible because lens 1722 is, after blocking mechanism 1720 has partially or wholly slid from the top of lens 1722, lens 1722 is no longer fully covered up or blocked by outer shell 1720. The blocking mechanism, or doors, 1720, may slide in any direction parallel to the face of lens 1722 (one example of such sliding is shown in FIGS. 17A-17C). However, the blocking mechanism 1720 may also retract away from lens 1722 in other ways as well. For example, the doors may fold open in any direction so as to uncover lens 1722. Furthermore, the doors may fold open and roll up or fold onto itself in any location on or near housing 1718.

Network video camera 1704 may also include an indication device similar to indication device 1524 in FIG. 15 and/or indication device 1624 in FIG. 16. Such an indication device may come in a variety of different forms. The indication device may be represented by a colored portion (or another similar differentiating aesthetic, such as texture, etc.) of lens 1722 or housing 1718. For example, as shown in FIGS. 17B and 17C, blocking mechanism 1720 may slide from a position where it completely covers lens 1722 and the front face of housing 1718 surrounding lens 1722 to a position where at least a portion of lens 1722 and housing 1718 are exposed. The portion of housing 1718 that is exposed may be a different color than the blocking mechanism 1720 so that when blocking mechanism 1720 moves from position to position to expose at least a part of lens 1722, the color from housing 1718 indicates to a user that a portion of lens 1722 is exposed. A combined housing 1718 and indication device 1724 may also indicate to a user what portion of the lens has been covered by blocking mechanism 1720 based on how much of the colored portion (e.g. all) of housing 1718 the user sees. Furthermore, the combined housing 1718 and indication device may also indicate to a user if the lens is completely covered if the user does not see any of the colored portion of housing 1718.

Figure 18C:
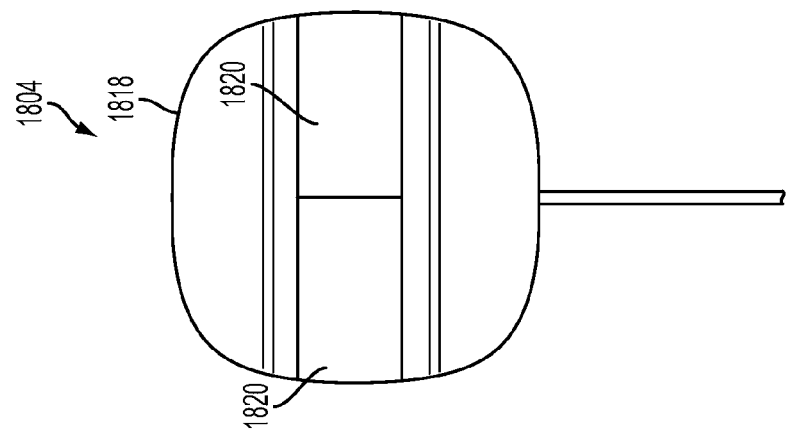
FIG. 18C illustrates an example of a network video camera, in accordance with some embodiments.
Figure 18B:
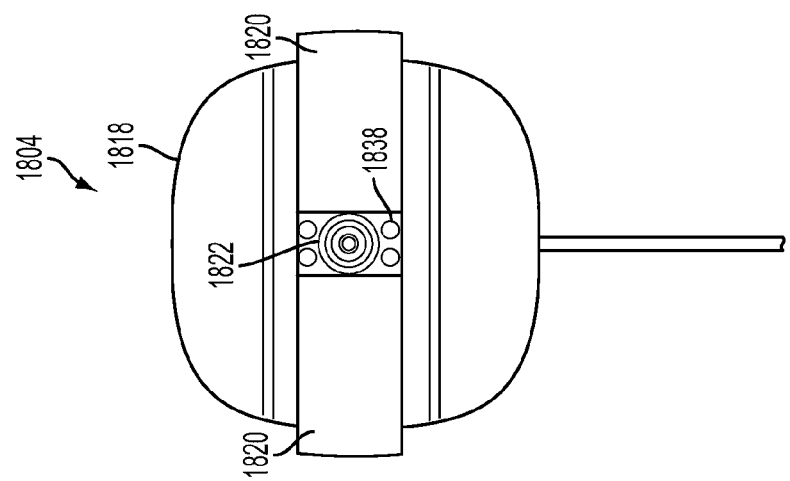
FIG. 18B illustrates an example of a network video camera, in accordance with some embodiments.
Figure 18A:
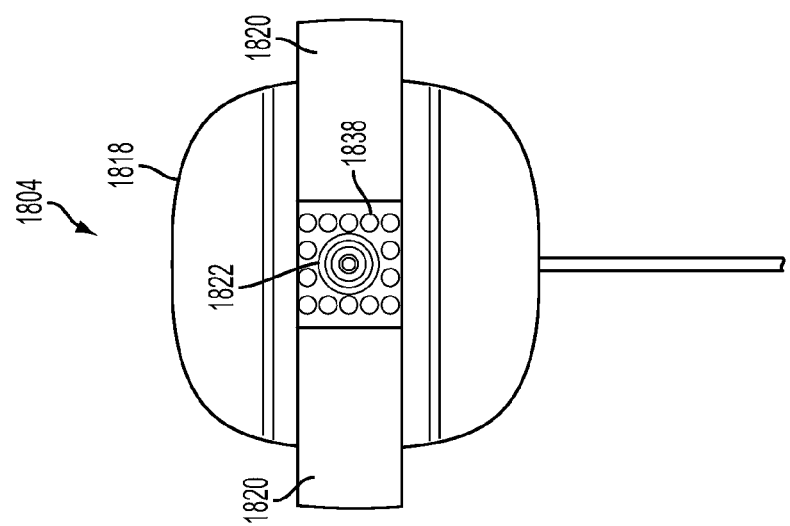
FIG. 18A illustrates an example of a network video camera, in accordance with some embodiments.

FIGS. 18A, 18B and 18C illustrate an example of a network video camera 1804, according to embodiments of the present invention. Network video camera 1804 includes a lens 1822, a housing 1818, and a blocking mechanism 1820. As shown in FIGS. 18B and 18C, the lens 1822 may be positioned within housing 1818. FIG. 18A shows a view of network video camera 1804 with lens 1822 fully covered or blocked by blocking mechanism 1820. FIG. 18B shows a view of network video camera 1804 with lens 1822 partially exposed and partially covered by blocking mechanism 1820. FIG. 18C shows a view of network video camera 1804 with lens 1822 fully exposed and not covered by blocking mechanism 1820.

As shown by FIGS. 18B and 18C and similar to FIGS. 17B and 17C, the blocking mechanism (blocking mechanism 1820) may be made up of two different portions of the device. More specifically, blocking mechanism 1820 may be made up of two portions of a device that are close to each other or touching each other when covering lens 1822, but that separate over time as the blocking mechanism 1820 is activated (and lens 1822 is activated and exposed). The two portions of blocking mechanism 1820 may, as shown in FIGS. 18B and 18C, each make up one-half of the whole blocking mechanism device. However, other portion sizes are also possible. Similar to blocking mechanism 1720, blocking mechanism 1820 is approximately the same width as the housing 1718, but may be smaller or larger depending on the embodiment. More generally, blocking mechanism 1820 may be any size or shape of device that in certain positions blocks, and in other positions exposes, lens 1822. Furthermore, while blocking mechanism 1720 is not the same height as lens 1722 of FIGS. 17A-17C and instead is significantly taller than lens 1722, blocking mechanism 1820 is approximately the same height as lens 1822.

As shown in FIGS. 18A and 18B, network video camera 1804 may include lights 1838 that are used to give light to the environment near camera 1804 so as to allow lens 1822 to see and/or capture the images of the environment (e.g. at night when the environment is otherwise dark) as desired by the camera and/or a user of the camera. The blocking mechanism 1820 may cover lights 1838 similar to how blocking mechanism 1820 blocks lens 1822, and may unblock lights 1838 as the blocking mechanism is deactivated. The lights 1838 may also be deactivated without the use of blocking mechanism 1820. For example, the lights 1838 may turn off so that the lights are visible (but not lit up) to a user looking at camera 1804.

FIGS. 19A, 19B and 19C illustrate an example of a network video camera 1904, according to embodiments of the present invention. Network video camera 1904 includes a lens 1922, a housing 1918, and a blocking mechanism 1920. As shown in FIGS. 19B and 19C, the lens 1922 may be positioned within housing 1918. FIG. 19A shows a view of network video camera 1904 with lens 1922 fully covered or blocked by blocking mechanism 1920. FIG. 19B shows a view of network video camera 1904 with lens 1922 partially exposed and partially covered by blocking mechanism 1920. FIG. 19C shows a view of network video camera 1904 with lens 1922 fully exposed and not covered by blocking mechanism 1920.

As shown in FIGS. 19B and 19C, lens 1922 is not placed in the center of housing 1918. Instead, lens 1922 is off-center and is towards one side of the housing 1918. As such, blocking mechanism 1920 must only slide less than one-half of the width of the housing 1918 to expose lens 1922. Similar to blocking mechanisms 1720 in FIGS. 17 and 1820 in FIG. 18, blocking mechanism 1918 spans approximately the width of housing 1918 (although various other shapes and sizes—e.g. lengths—are possible). However, unlike blocking mechanisms 1720 in FIGS. 17 and 1820 in FIG. 18, blocking mechanism 1918, blocking mechanism 1920 is made up of a single structure and slides as a whole in one direction to expose lens 1922 (and in the opposite direction to cover up lens 1922).

Figure 20C:
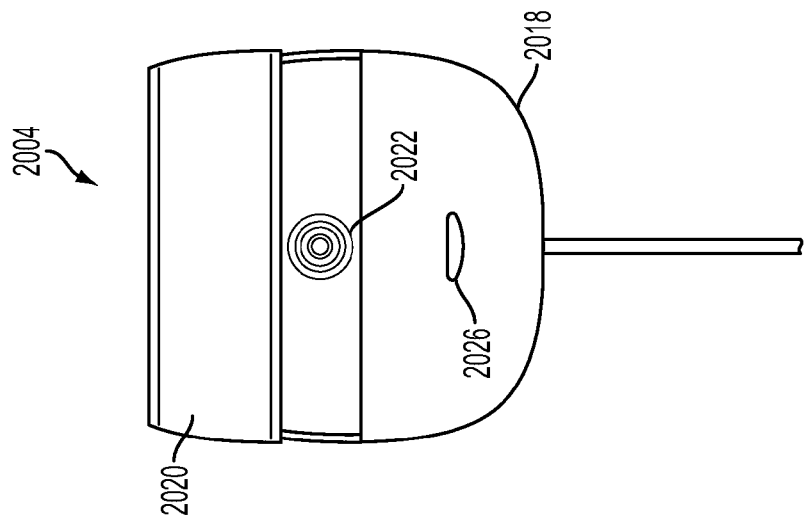
FIG. 20C illustrates an example of a network video camera, in accordance with some embodiments.
Figure 20B:
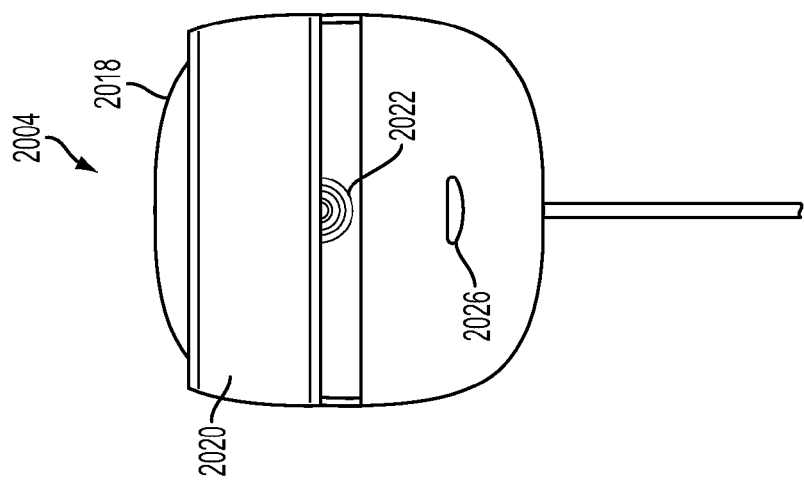
FIG. 20B illustrates an example of a network video camera, in accordance with some embodiments.
Figure 20A:
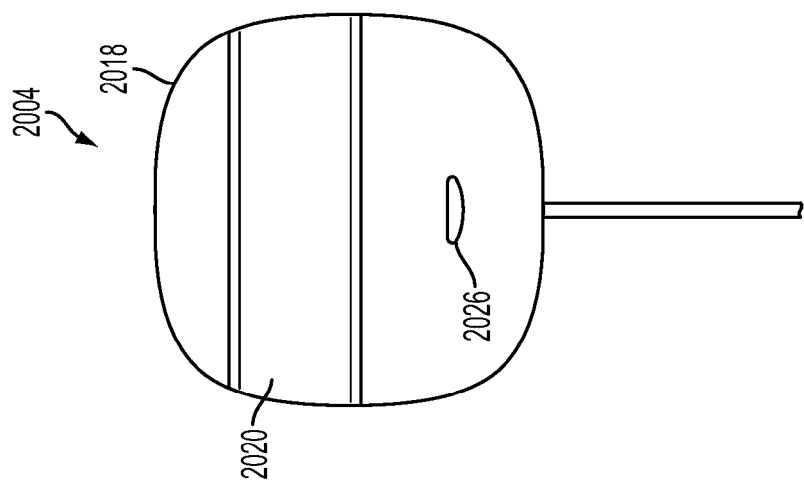
FIG. 20A illustrates an example of a network video camera, in accordance with some embodiments.

FIGS. 20A, 20B and 20C illustrate an example of a network video camera 2004, according to embodiments of the present invention. Network video camera 2004 includes a lens 2022, a housing 2018, and a blocking mechanism 2020. As shown in FIGS. 20B and 20C, the lens 2022 may be positioned within housing 2018. FIG. 20A shows a view of network video camera 2004 with lens 2022 fully covered or blocked by blocking mechanism 2020. FIG. 20B shows a view of network video camera 2004 with lens 2022 partially exposed and partially covered by blocking mechanism 2020. FIG. 20C shows a view of network video camera 2004 with lens 2022 fully exposed and not covered by blocking mechanism 2020. Network video camera 2004 is similar to network video camera 1904 in FIG. 19 except that lens 2022 is placed/located in approximately the middle of housing 1918 and blocking mechanism 2020 slides up and down instead of left and right. As shown in FIGS. 19 and 20, the lens within a network video camera may be placed anywhere within its housing according to embodiments of the present invention. Furthermore, the blocking mechanism of the network video camera may be any size/shape and may cover/uncover the lens in a variety of different ways.

Figure 21A:
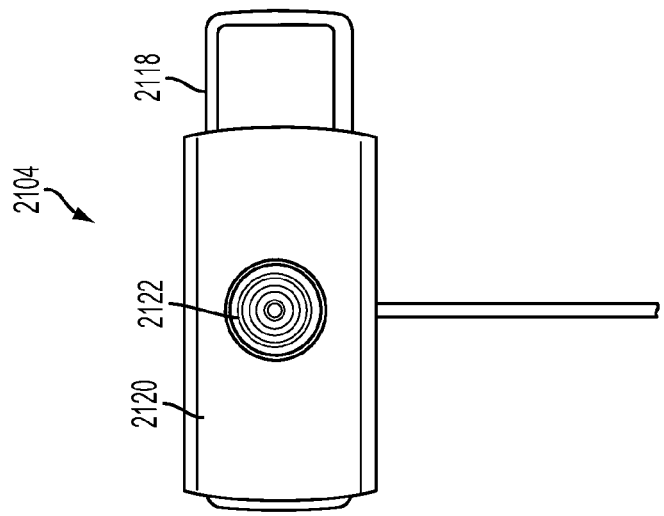
FIG. 21A illustrates an example of a network video camera, in accordance with some embodiments.
Figure 21B:
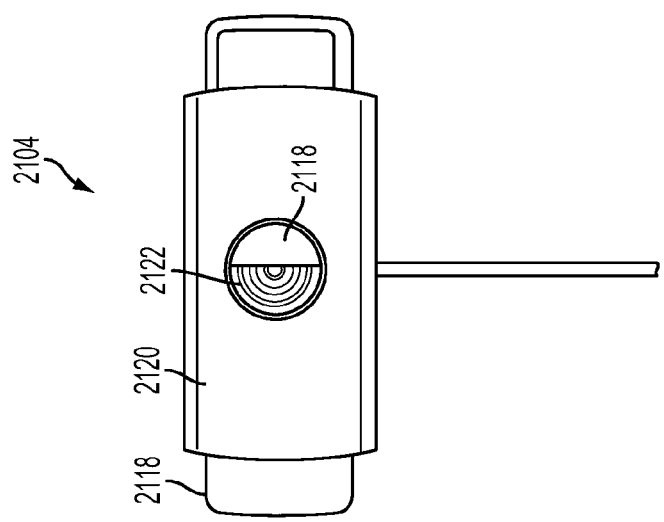
FIG. 21B illustrates an example of a network video camera, in accordance with some embodiments.
Figure 21C:
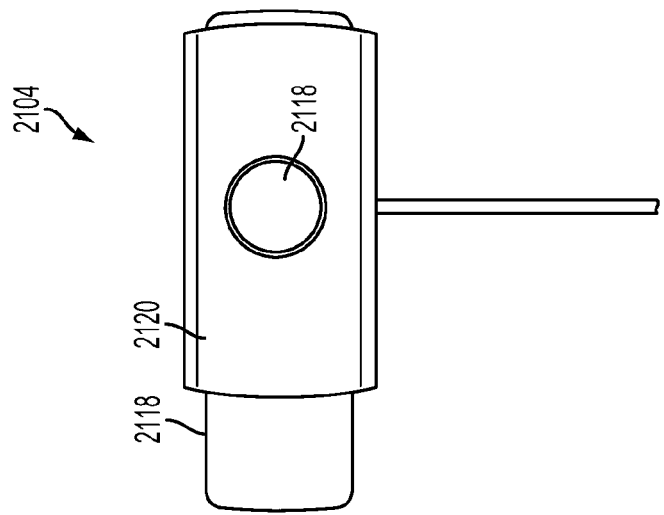
FIG. 21C illustrates an example of a network video camera, in accordance with some embodiments.

FIGS. 21A, 21B and 21C illustrate an example of a network video camera 2104, according to embodiments of the present invention. Network video camera 2104 includes a lens 2122, a housing 2118, and an outer shell, outer casing or outer housing (also a blocking mechanism) 2120. As shown in FIGS. 21B and 21C, the lens 2122 may be positioned within housing 2118. FIG. 21A shows a view of network video camera 2104 with lens 2122 fully covered or blocked by blocking mechanism 2120. FIG. 21B shows a view of network video camera 2104 with lens 2122 partially exposed and partially covered by blocking mechanism 2120. FIG. 21C shows a view of network video camera 2104 with lens 2122 fully exposed and not covered by blocking mechanism 2120.

Similar to FIGS. 12-14, as shown by the progression of the views of the network video camera (network video camera 2104) from FIG. 21A to FIG. 21B to FIG. 21C, housing 2118, which houses lens 2122, may be connected to or otherwise contact outer shell 2120 such that housing 2118 is configured to slide out of outer shell 2120. More specifically, the casing/shell 2120 or the lens 2122 can be moved so that the shell 2120, or blocking mechanism 2120, covers the lens 2122. For example, the shell/casing itself may be movable, and can be moved to cover the lens 2122. In another example, the casing is stationary, and the camera 2104 or the lens 2122 may be moved so that the lens 2122 is covered by the casing. While housing 2118 is in the process of sliding out of outer shell 2120 and after housing 2118 has slid out of outer shell 2120, lens 2122 may be partially or wholly visible, as shown in FIGS. 21B and 21C. Lens 2122 may be partially or wholly visible because lens 2122 is, after housing 2122 has partially or wholly slid out of outer shell 2120, no longer fully covered up or blocked by outer shell 2120. As such, outer housing 2120 may serve double duty and also act as a blocking mechanism that blocks part or all of lens 2122. Alternatively, outer shell 2120 may not provide double-duty as a blocking mechanism. In such a case, outer shell 2120 may serve only as an outer casing or protection for lens 2122 and the rest of network video camera 2104. Furthermore, such an embodiment may include a separate blocking mechanism. That blocking mechanism may connect to housing 2118, housing 2120, and/or lens 2122, and may block the lens 2122 when the blocking mechanism is activated.

Network video camera 2104 may also include an indication device to indicate or notify to the user the current state of the network video camera 2104. For example, the indication device may be implemented using a coloring scheme as noted with respect to FIGS. 15A-15B. More specifically, lens 2122 may serve as the indication device such that the user is notified that the lens may be viewing its environment because the user sees the face of the lens. Alternatively, the housing 2118 may be colored such that the user is notified when the lens is not in use (and, therefore, knows that the lens is in use when the user does not see that color). Other indicators other than colors may be used as described herein. Furthermore, the indicators may be in other locations within the network video camera 2104. For example, an LED indicator may be located on the outer casing 2120 to indicate to the user when the lens/camera is in use.

Figure 22C:
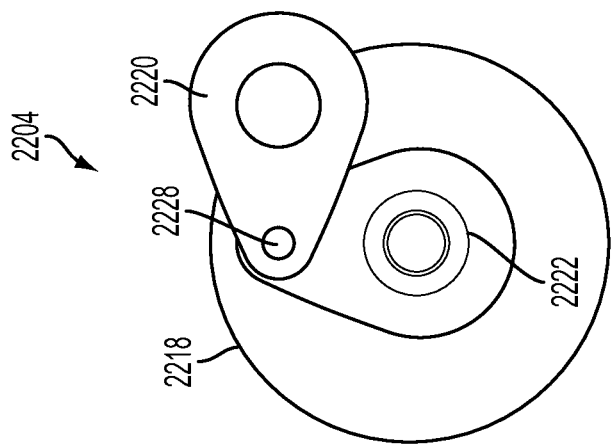
FIG. 22C illustrates an example of a network video camera, in accordance with some embodiments.
Figure 22B:
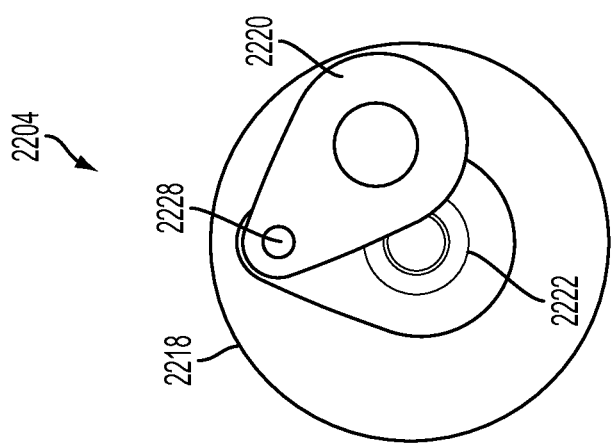
FIG. 22B illustrates an example of a network video camera, in accordance with some embodiments.
Figure 22A:
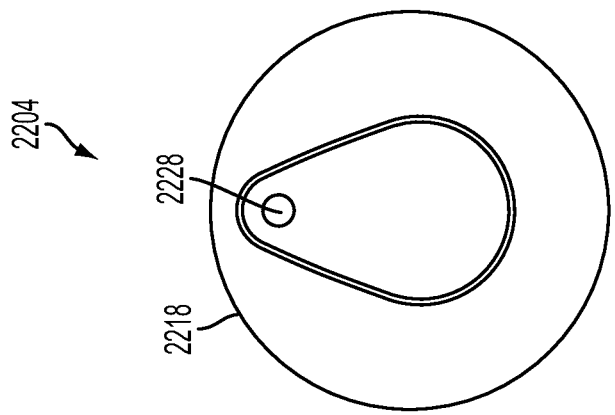
FIG. 22A illustrates an example of a network video camera, in accordance with some embodiments.

FIGS. 22A, 22B and 22C illustrate an example of a network video camera 2204, according to embodiments of the present invention. Network video camera 2204 includes a lens 2222, a housing 2218, and a blocking mechanism 2220. As shown in FIGS. 22B and 22C, the lens 2222 may be positioned within housing 2218. FIG. 22A shows a view of network video camera 2204 with lens 2222 fully covered or blocked by blocking mechanism 2220. FIG. 22B shows a view of network video camera 2204 with lens 2222 partially exposed and partially covered by blocking mechanism 2220. FIG. 22C shows a view of network video camera 2204 with lens 2222 fully exposed and not covered by blocking mechanism 2220.

Blocking mechanism 2220 is connected to housing 2218 using a hinge 2228. Hinge 2228 connects one end (e.g. the top tip) of blocking mechanism 2220 to a portion of housing 2218 above lens 2222 such that blocking mechanism 2220 hangs down and hovers over lens 2222. To deactivate the blocking mechanism 2220, or to uncover lens 2222 and allow it to view its environment for the purpose of recording, blocking mechanism 2220 may swing in a direction parallel to the surface of housing 2218 as shown in the progression from FIG. 22A to FIG. 22B and FIG. 22C. A mechanism (not shown) may be connected to either housing 2218 or blocking mechanism 2220 to keep blocking mechanism 2220 at its desired position (for example, without such a mechanism, if blocking mechanism 2220 is not hanging straight down, blocking mechanism 2220 may swing back down over lens 2222 due to gravity). For example, such a mechanism may include a latch, a stopper, or another device to hold blocking mechanism 2220 at its desired position. Alternatively, blocking mechanism 2220 may be pressed against housing 2218 such that friction between the blocking mechanism 2220 and housing 2218 may cause blocking mechanism 2220 to stay at the desired location. In an alternative embodiment, a motor and its associated gears, which may be otherwise used to move or "swing" mechanism 2220, may hold the blocking mechanism 2220 in a desired location.

Figure 23C:
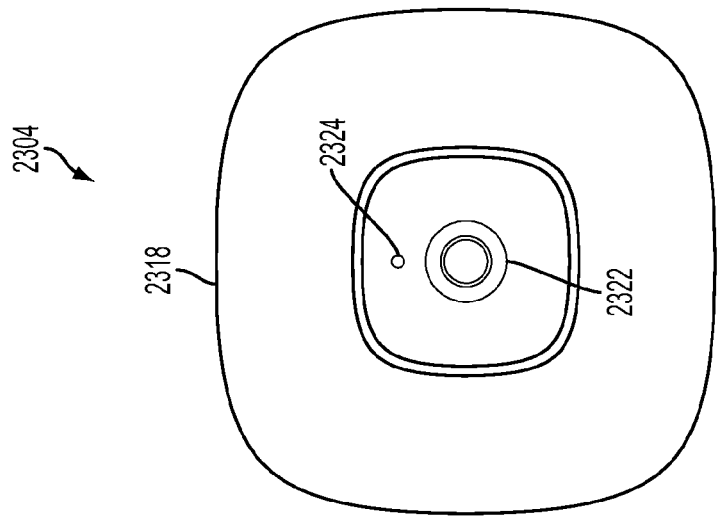
FIG. 23C illustrates an example of a network video camera, in accordance with some embodiments.
Figure 23B:
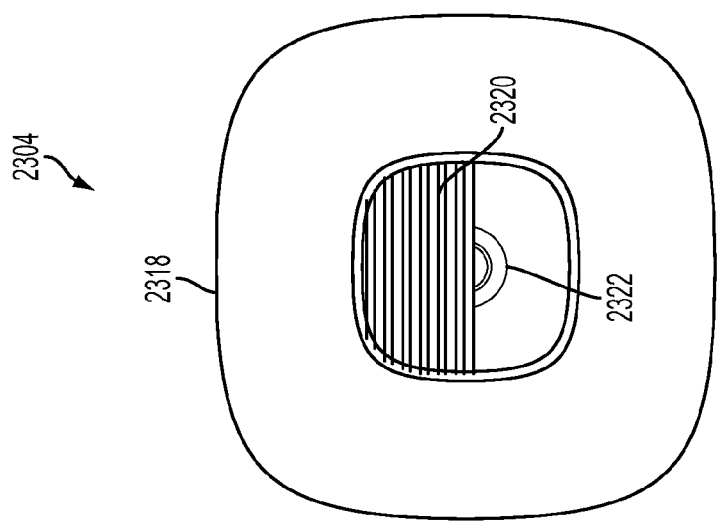
FIG. 23B illustrates an example of a network video camera, in accordance with some embodiments.
Figure 23A:
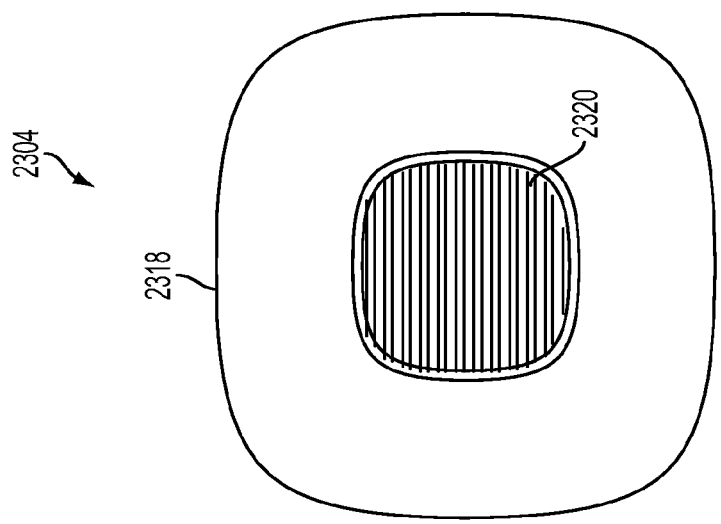
FIG. 23A illustrates an example of a network video camera, in accordance with some embodiments.

FIGS. 23A, 23B and 23C illustrate an example of a network video camera 2304, according to embodiments of the present invention. Network video camera 2304 includes a lens 2322, a housing 2318, and a blocking mechanism 2320. As shown in FIGS. 23B and 23C, the lens 2322 may be positioned within housing 2318. FIG. 23A shows a view of network video camera 2304 with lens 2322 fully covered or blocked by blocking mechanism 2320. FIG. 23B shows a view of network video camera 2304 with lens 2322 partially exposed and partially covered by blocking mechanism 2320. FIG. 23C shows a view of network video camera 2304 with lens 2322 fully exposed and not covered by blocking mechanism 2320.

Blocking mechanism 2320 in FIGS. 23A-23C is similar to blocking mechanism 1620 in FIGS. 16A-16C. However, while blocking mechanism 1620 "slid" from a position at least partially inside housing 1618 to a position over lens 1622 to block lens 1622, blocking mechanism 2320 rolls up at the edge of lens 2322 when deactivated and not covering lens 2322, and then rolls out to activate and cover lens 2322. In other words, blocking mechanism 1620 rolls similar to a window shade or a projector screen, for example. Explained another way, blocking mechanism 1620 rolls up such that it collects in a narrow portion of housing 1618 until it is activated, at which point it unrolls as much as is necessary to cover the portion of lens 2322 desired by the network video camera 2304. Blocking mechanism 2320 may also cover the lens in different ways. For example, the blocking mechanism may roll over the lens moving left to right (and deactivated in reverse from right to left) or in another direction instead of up and down, as shown in FIGS. 23A-23C.

Network video camera 2304 also includes an indication device 2324. Indication device 2324 may include any of the indication device embodiments described herein (similar to those described with respect to e.g. indication device 1524 in FIGS. 15A-15C). Furthermore, any embodiment of a network video camera that is not shown as including an indication device may include one according to embodiments of the present invention, and may include any of the indication device embodiments described herein. Furthermore, other features (e.g. those features related to blocking mechanisms, or other features of a network video camera described herein) described with respect to one embodiment of the present invention may also be a part of another embodiment described herein.

Figure 24C:
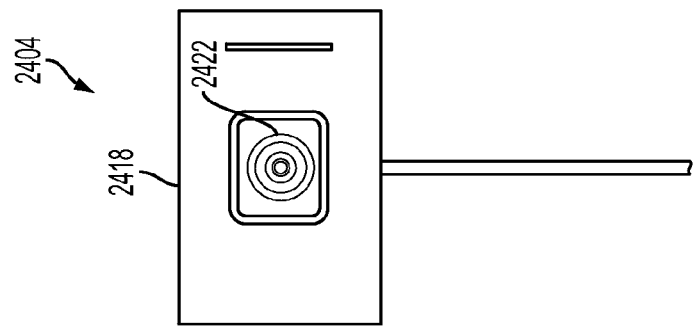
FIG. 24C illustrates an example of a network video camera, in accordance with some embodiments.
Figure 24B:
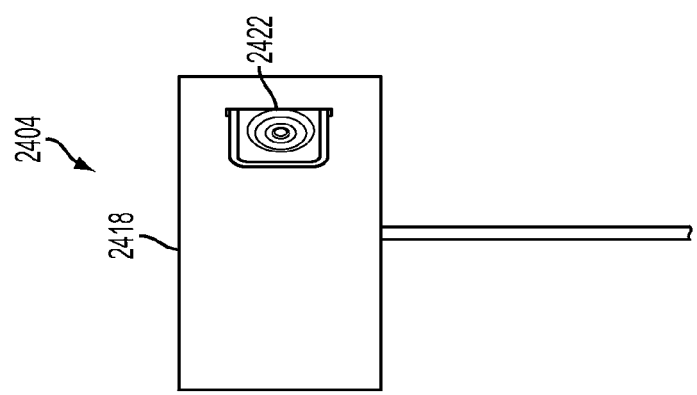
FIG. 24B illustrates an example of a network video camera, in accordance with some embodiments.
Figure 24A:
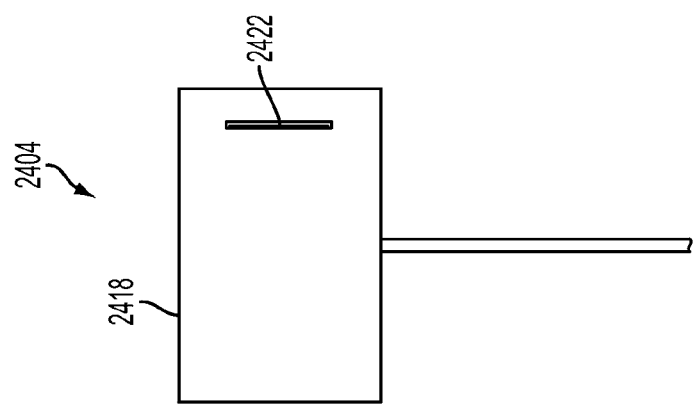
FIG. 24A illustrates an example of a network video camera, in accordance with some embodiments.

FIGS. 24A, 24B and 24C illustrate an example of a network video camera 2404, according to embodiments of the present invention. Network video camera 2404 includes a lens 2422 and a housing 2418. As shown in FIGS. 24B and 24C, the lens 2422 may be positioned within housing 2418. FIG. 24A shows a view of network video camera 2404 with lens 2422 blocked because the face of the lens is pointing at a ninety degree angle (towards the right of the housing) from the direction that the face of the housing is pointing. However, the lens may rotate more or less than ninety degrees in different embodiments of the present invention. For example, the lens may rotate 180 degrees, which may be necessary to block the vision/view of the lens if the lens is a 180 degree camera. The lens may also rotate 95 degrees, 100 degrees, 135 degrees, or any other amount in between 0 and 180 degrees. Furthermore, even when pointing in one direction without rotating, lens 2422 (or other lenses described herein) may have a visibility (or ability to capture) across an 180 (or anywhere between 0 and 180 degrees) radius or field of view. Furthermore, for example, the lenses may have a 210 (or more) degrees field of view on a diagonal. Lens 2422 may be pointing into an interior wall of housing 2418 so as to not capture video of the environment in front of the network video camera 2404. Alternatively, lens 2422 may be covered, after it has rotated a certain amount, by a blocking mechanism or other cover connected to housing 2418 or other portion of camera 2404 that is separate from housing 2418. FIG. 24B shows a view of network video camera 2404 with lens 2422 partially exposed and partially covered. FIG. 24C shows a view of network video camera 2404 with lens 2422 fully exposed and not covered.

FIGS. 25A, 25B and 25C illustrate an example of a network video camera 2504, according to embodiments of the present invention. Network video camera 2504 includes a lens 2522 and a housing 2518. As shown in FIGS. 25B and 25C, the lens 2522 may be positioned within housing 2518. FIG. 25A shows a view of network video camera 2504 with lens 2522 blocked because the face of the lens is pointing at a ninety degree angle (downward) from the direction that the face of the housing is pointing. For example, the lens 2522 may be pointing into an interior wall of housing 2518 so as to not capture video of the environment in front of the network video camera 2504. FIG. 25B shows a side view of network video camera 2504 with lens 2522 partially exposed and partially covered. 25C shows a view of network video camera 2504 with lens 2522 partially exposed and partially covered. FIG. 25D shows a view of network video camera 2504 with lens 2522 fully exposed and not covered.

FIGS. 24A-24C and FIGS. 25A-25D illustrate example network video cameras that are configured to block the lens of the video device without using a separate blocking mechanism, according to embodiments of the present invention. Unlike the blocking mechanisms described with respect to FIGS. 15-23, network video cameras 2404 and 2504 are configured to block (and subsequently expose) their lenses using a portion of network video cameras 2404 and 2504 themselves, such as housings 2418 and 2518, respectively. As shown in FIG. 25B, such a configuration may be accomplished using a device to connect lens 2522 to housing 2518 so as to hold the lens 2522 a certain predetermined distance away from the housing 2518. The connection device may be in the form of an arm, such as arm 2532 in FIG. 25B. However, other types of connection devices are possible. Furthermore, such a configuration may also be accomplished with the lens connected directly to the housing of the network video camera. For example, a portion of the housing, for example the portion of the housing that is connected to the lens, may move with the lens to rotate the lens inward into the housing so as to cover the face of the lens. The device (e.g. arm) may allow the lens 2522 to rotate or move in any direction as controlled by the user. For example, the lens may move closer to the housing 2518, or the lens may move farther away from housing 2518 (e.g. out of the page in FIGS. 25A, 25C and 25D) as directed by the arm 2532. In other words, the arm may extend or contract.

As noted, embodiments of the present invention may include indication devices to indicate to the user or notify the user that the video network device is in a particular state (e.g. lens uncovered and capturing video, or lens covered and not capturing video, etc.). For example, as described herein, the indication device may be represented by a colored portion (or another similar differentiating aesthetic, such as texture, etc.) of blocking mechanism (e.g. as described with respect to blocking mechanism 1624 in FIG. 16). For example, the blocking mechanism may be a different color than the housing so that when the blocking mechanism moves from within housing to cover at least a part of lens, the color from blocking mechanism indicates to a user that a portion of lens is being blocked by blocking mechanism. Alternatively, with respect to FIGS. 24A-24C and/or 25A-25D, a similar configuration may be accomplished using the lens itself. For example, a top or side wall/surface of the lens may be a certain color, such as a color that is different from the color of the housing. Therefore, when the lens turns, only certain portions of the colored wall of the lens may be visible to the user when the lens is turned at certain angles. In some situations, like in FIGS. 24A and 25A, the entire colored wall may be visible (or wholly not visible, depending on the embodiment), indicating to the user that the lens is deactivated and is not in use.

Figure 26A:
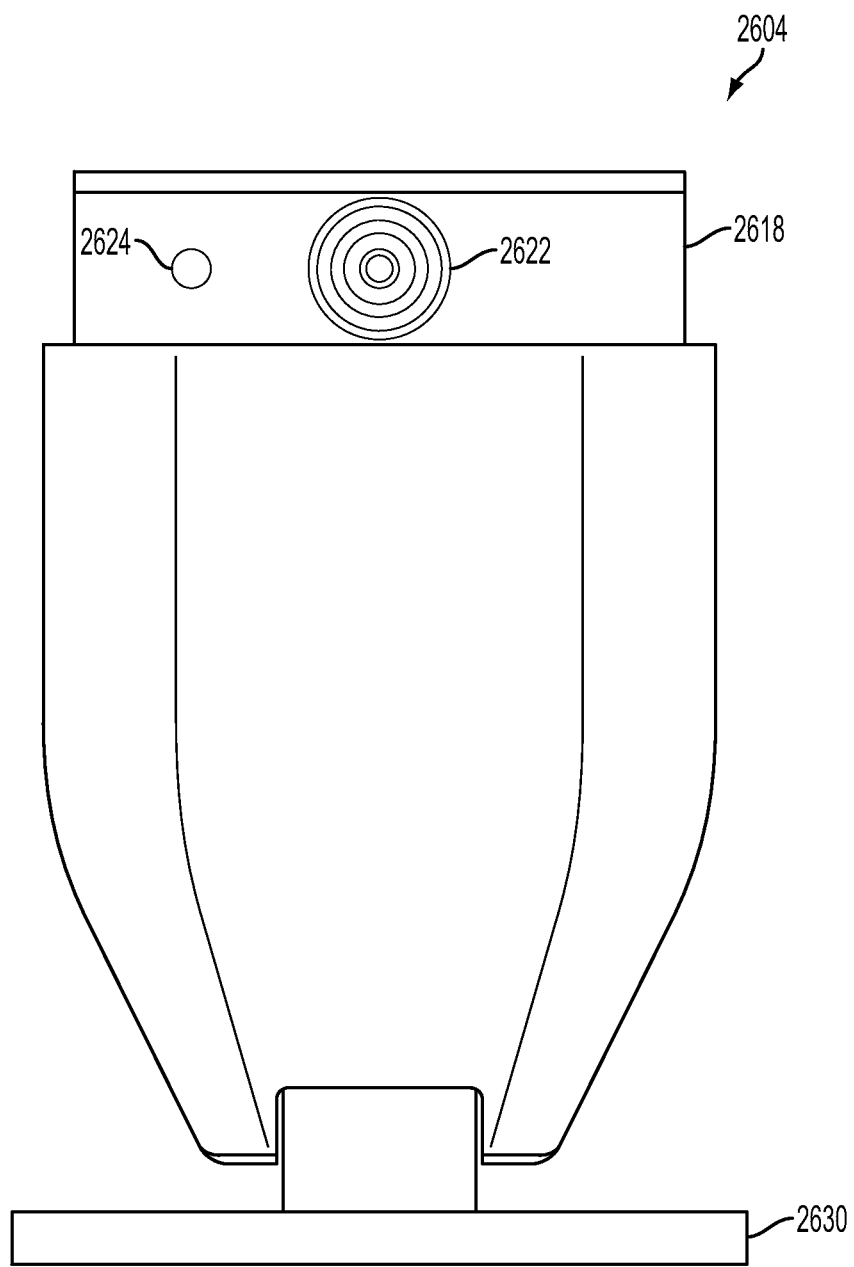
FIG. 26A illustrates an example of a network video camera connected to a stand, in accordance with some embodiments.

As noted, various different embodiments of the present invention may be tweaked to create slightly alternative embodiments of the present invention. For example, the network video cameras of FIGS. 12-25 are described or shown as being connected to a wall or other structure such that the devices are stationary and may capture video of their environment. For example, as described, the housing of a network video camera may be attached to a wall or other structure. However, the network video camera may be incorporated into a different type of host environment, such as in a stand or a wall-bracket that adjusts (i.e. moves) as needed, as shown in FIG. 26A. FIG. 26A illustrates a network video camera 2604, including a housing 2618, a lens 2622, and an indication device 2624, connected to a stand 2630, according to embodiments of the present invention.

Figure 26B:
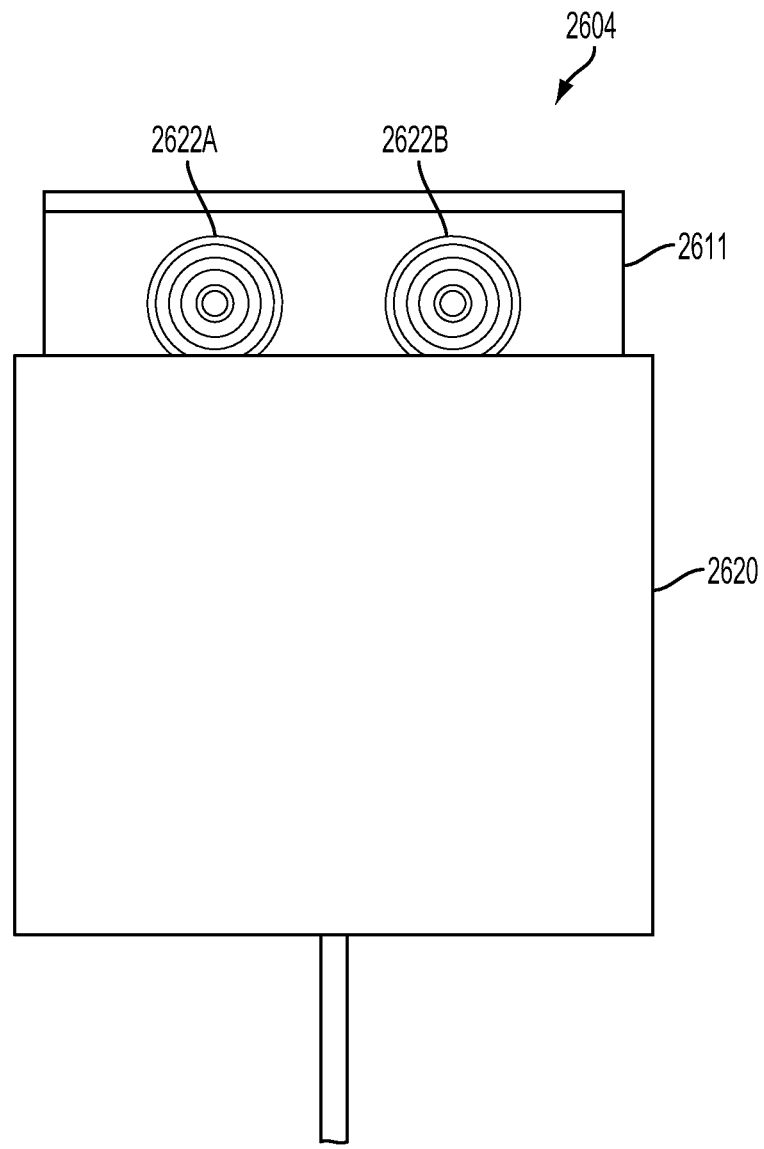
FIG. 26B illustrates an example of a network video camera with multiple lenses, in accordance with some embodiments.

In an alternative embodiment, as noted, the network video cameras described herein according to embodiments of the present invention may include multiple lenses. FIG. 26B illustrates an example of a network video camera 2604, which includes a housing 2618 and lenses 2622A and 2622B, according to embodiments of the present invention. As shown in FIG. 26B, the lenses 2622A and 2622B may be positioned within housing 2618. Any of the embodiments described herein may include multiple lenses, and such embodiments may include more than two (e.g. three, four, five, six, etc.) lenses. Furthermore, the lenses may be positioned within the housing of the network video cameras in different ways, such as on top of each other, staggered, offset, or in any other way. Furthermore, the lenses of the network video cameras may be attached to the outside of the housing instead of positioned inside the housing. In another alternative embodiment, the lenses may be connected to the housing of the network video cameras with an additional device, such as a mechanical arm or another connection device, in between them.

Figure 27C:
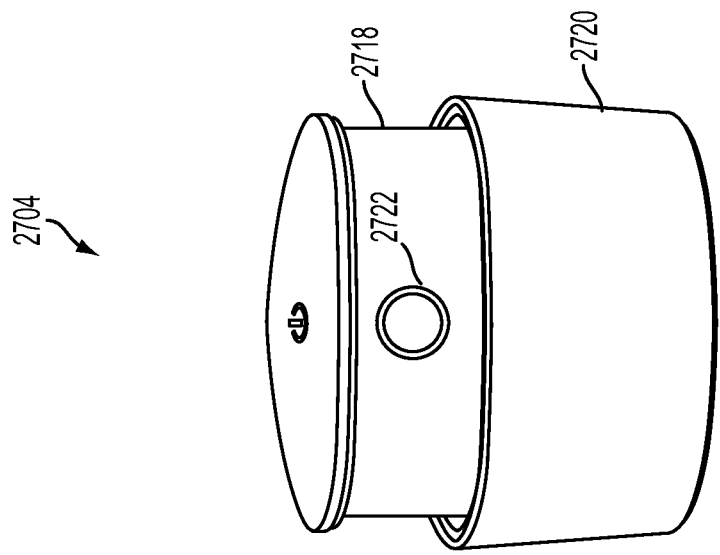
FIGS. 27A, 27B and 27C illustrate different views of an example of a network video camera, according to embodiments of the present invention.
Figure 27B:
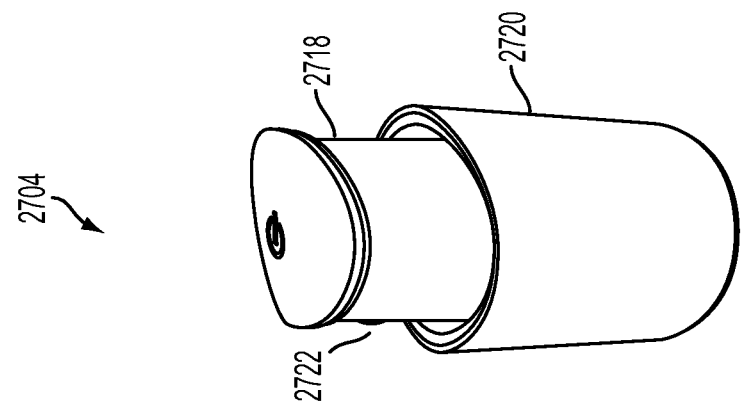
Figure 27A:
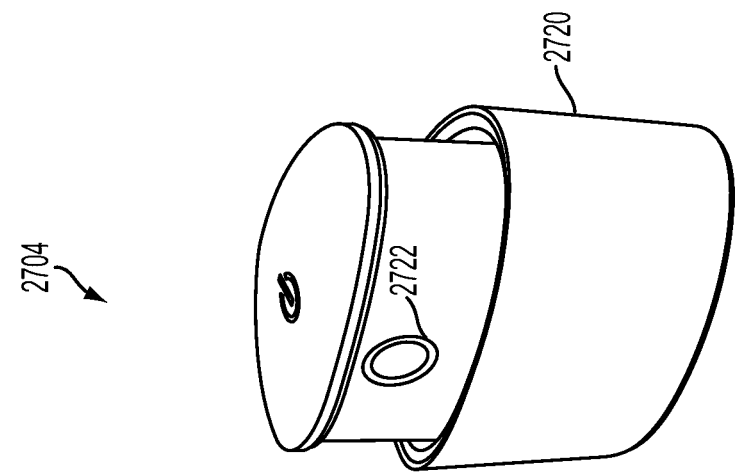

FIGS. 27A, 27B and 27C illustrate an example of a network video camera 2704, according to embodiments of the present invention. Network video camera 2704 includes a lens 2722, a housing 2718, and an outer shell, outer casing or outer housing 2720. The lens 2722 may be positioned within housing 2718. As noted, network video camera 2704 may include multiple lenses. FIGS. 27A-27C show three different views of network video camera 2704, each with housing 2718 positioned outside outer housing 2720 (e.g., fully protruding out from—an opening in the top of—outer housing 2720) such that lens 2722 is visible and such that lens 2722 can view its environment. Network video camera 2704 may also perform similarly to network video camera 1204 as shown in FIGS. 12-14. For example, housing 2718 may retract into outer housing 2720 such that outer housing 2720 may block the view of lens 2722 such that lens 2722 may not view or record its environment (e.g. outer housing 2720 acts as a blocking mechanism).

More specifically, housing 2718, which houses lens 2722, may be connected to outer shell 2720 such that housing 2718 is configured to slide in and out of outer shell 2720. More specifically, the casing/shell 2720 or the lens 2722 can be moved so that the blocking mechanism 2720 covers the lens 2722. For example, the shell/casing itself may be movable, and can be moved to cover the lens 2722. In another example, the casing is stationary, and the camera 2704 or the lens 2722 may be moved so that the lens 2722 is covered by the casing. While housing 2718 is in the process of sliding out of outer shell 2720 and after housing 2718 has slid out of outer shell 2720, lens 2722 may be partially or wholly visible. Lens 2722 may be partially or wholly visible because lens 2722 is, after housing 2718 has partially or wholly slid out of outer shell 2720, no longer fully covered up or blocked by outer shell 2720. As such, outer housing 2720 may serve double duty and also act as a blocking mechanism that blocks part or all of lens 2722. A progression of housing 2718 sliding in and out of outer housing 2720 is shown, for example, in FIGS. 12-14.

It should be appreciated that the video camera 2704 may have other components than those depicted. Further, the embodiment shown in the figures is only one example of a video camera that may incorporate an embodiment of the invention. In some other embodiments, video camera 104 may have more or fewer components than shown in the figure, may combine two or more components, or may have a different configuration or arrangement of components. For example, as shown in FIG. 27A-C, the shape of outer shell 2720 (and, similarly, housing 2718) is an oval. However, housing 2718 and outer shell 2720 may be in the form of other shapes, such as a cylinder. Furthermore, the head or top of housing 2718 (which could be perceived as a part, or the top, of outer shell 2720) is the same or similar shape as outer shell 2720. However, housing 2718 may take on various shapes, sizes, and portions of the whole network video camera 2704, as shown below in FIGS. 28A-29C.

Similar to as shown with respect to FIG. 21, network video camera 2704 may also include an indication device to indicate or notify to the user the current state of the network video camera 2704. For example, the indication device may be implemented using a coloring scheme. More specifically, lens 2722 may serve as the indication device such that the user is notified that the lens may be turned on, in use, and/or viewing its environment because the user sees the face of the lens. Alternatively, the housing 2118 may be colored such that the user is notified when the lens is not in use (and, therefore, knows that the lens is in use when the user does not see that color). For example, lens 2722 and/or housing 2718 may be a different color than outer shell 2720 (e.g. black vs. white) so that a user knows that the video camera is on or in use if the see the black face of lens 2722 and/or housing 2718. The fact that housing 2718 (and therefore lens 2722) may retract into and be hidden by outer housing 2720 includes the benefit that the video camera as a whole may be somewhat or fully hidden from view when it is turned off (or, for example, it may blend in with its surroundings). Other indicators other than colors may be used as described herein. Furthermore, the indicators may be in other locations within the network video camera 2704. For example, an LED indicator may be located on the outer casing 2720 to indicate to the user when the lens/camera is in use.

Figure 28C:
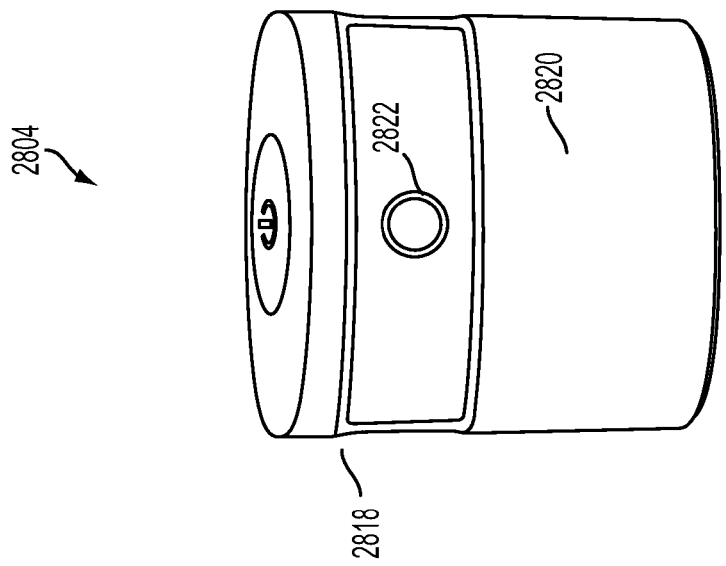
FIGS. 28A, 28B and 28C illustrate different views of an example of a network video camera, according to embodiments of the present invention.
Figure 28B:
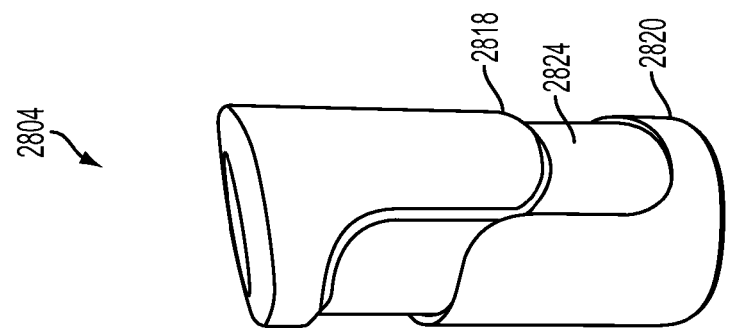
Figure 28A:
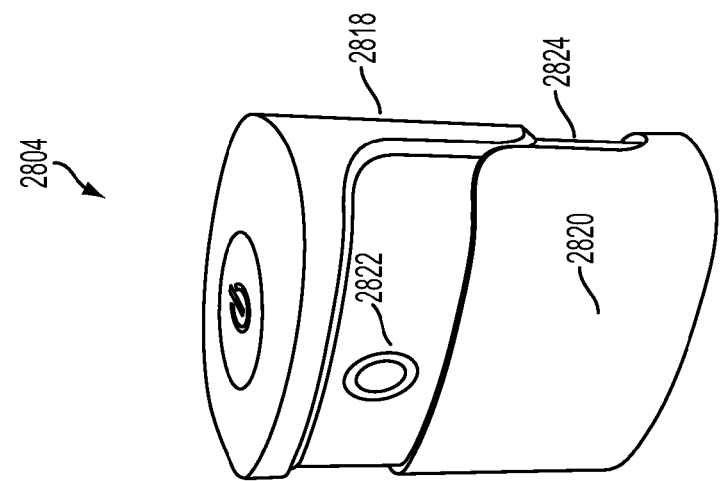

FIGS. 28A-28C illustrate an example of a network video camera 2804, according to embodiments of the present invention. Similar to network video camera 2704 in FIGS. 27A-C, network video camera 2804 includes a lens 2822, a housing 2818, and an outer shell, outer casing or outer housing 2820. The lens 2822 may be positioned within housing 2818. FIGS. 28A-28C show three different views of network video camera 2804, each with housing 2818 positioned outside outer housing 2820 (e.g., fully protruding out from—an opening in the top of—outer housing 2820) such that lens 2822 is visible and such that lens 2822 can view its environment. Network video camera 2804 may also perform similarly to network video camera 1204 as shown in FIGS. 12-14. For example, housing 2818 may retract into outer housing 2820 such that outer housing 2820 may block the view of lens 2822 such that lens 2822 may not view or record its environment (e.g. outer housing 2820 acts as a blocking mechanism).

Network video camera 2804 is similar to network video camera 2704 except that housing 2818 and outer shell 2820 include different structures than housing 2718 and 2720 in FIGS. 27A-C. For example, instead of being in an oval shape that cuts uniformly around the outside structure of the video camera 2804, housing 2804 extends lower towards the bottom of video camera 2804 on the back portion of the camera (e.g. it includes most of the back portion structure of camera 2804). In other words, instead of the bottom of the housing resting directly on top of the outer shell uniformly around the video camera as in FIGS. 27A-C, the housing 2818 and outer shell 2820 fit into each other like puzzle pieces.

Figure 29C:
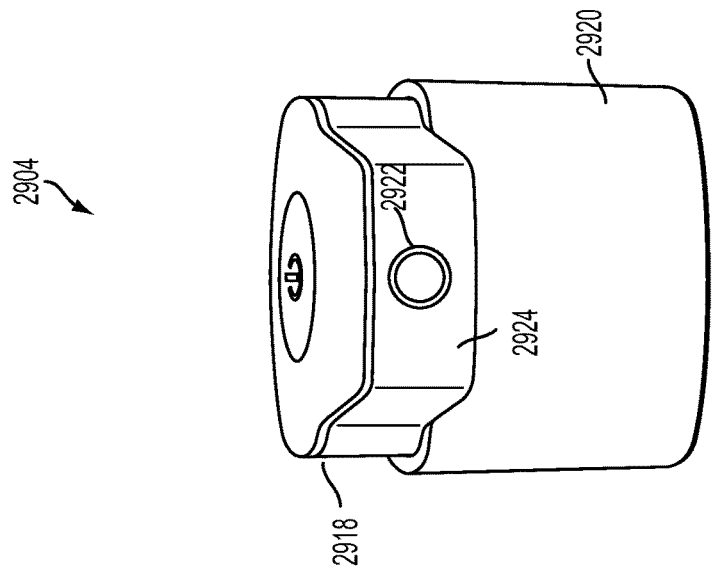
FIGS. 29A, 29B and 29C illustrate different views of an example of a network video camera, according to embodiments of the present invention.
Figure 29B:
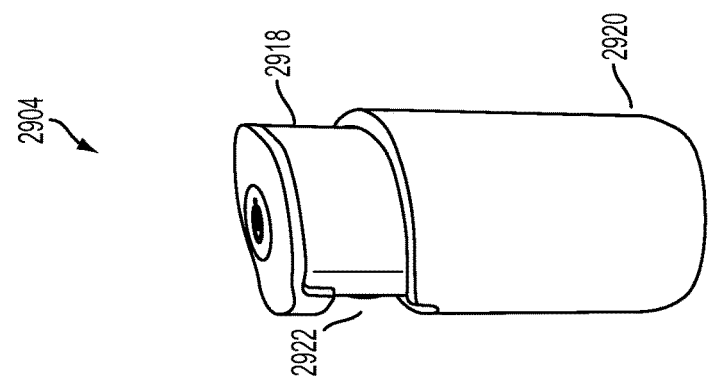
Figure 29A:
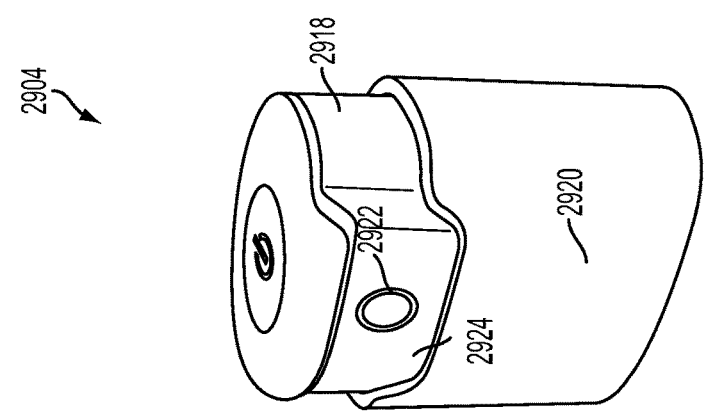

FIGS. 29A-C illustrate an example of a network video camera 2904, according to embodiments of the present invention. Similar to network video camera 2704 in FIGS. 27A-C, network video camera 2904 includes a lens 2922, a housing 2918, and an outer shell, outer casing or outer housing 2920. The lens 2922 may be positioned within housing 2918. FIGS. 29A-29C show three different views of network video camera 2904, each with housing 2918 positioned outside outer housing 2920 (e.g., fully protruding out from—an opening in the top of—outer housing 2920) such that lens 2922 is visible and such that lens 2922 can view its environment. Network video camera 2904 may also perform similarly to network video camera 1204 as shown in FIGS. 12-14. For example, housing 2918 may retract into outer housing 2920 such that outer housing 2920 may block the view of lens 2922 such that lens 2922 may not view or record its environment (e.g. outer housing 2920 acts as a blocking mechanism).

Network video camera 2904 is similar to network video camera 2704 except that housing 2918 and outer shell 2920 include different structures than housing 2718 and 2720 in FIGS. 27A-C. For example, instead of being in an oval shape that cuts uniformly around the outside structure of the video camera 2904, housing 2904 extends slightly lower towards the bottom of video camera 2904 on the front portion of the camera (e.g. it includes an amount of the back portion structure of camera 2904). In other words, instead of the bottom of the housing resting directly on top of the outer shell uniformly around the video camera as in FIGS. 27A-C, the housing 2918 and outer shell 2920 fit into each other like puzzle pieces in a non-uniform manner.

As noted, network video camera 2704 may also include an indication device to indicate or notify to the user the current state of the network video camera 2704, such as a coloring scheme. The embodiments shown in FIGS. 28A-C and 29A-C provide for different, and possibly enhanced, indication devices. For example, a user in a home may have a stronger indication that video camera 2804 or 2904 is turned on because they provide for greater surface areas of housings 2818 and 2918 that are exposed when housings 2818 and 2918 open or slid outside of outer shells 2820 and 2920, respectively. For example, video camera 2804 includes additional exposed area 2824 and video camera 2904 includes additional exposed area 2924 that are exposed when, as shown in FIGS. 28A-C and 29A-C, housings 2818 and 2918, respectively, are separated from outer shells 2820 and 2920. Additional exposed areas 2824 and 2924 may provide for an additional indication, as compared to video camera 2704 in FIGS. 27A-C, that the video camera is turned on, or at least that lens 2822 and 2922, respectively, are exposed and may be capturing their environments. Overall, network video cameras included in embodiments of the present technology provide for enhanced indications to a user of their current state (e.g., on or off, among others). In other words, the video cameras described herein provide for suggestive hints of the state of the camera.

Furthermore, the indicators described above (e.g. shape of the camera housings, etc.) provide for a further indication to a user that the camera has the ability to be closed by hand by simply tapping or pushing down on the top of the lens housing. For privacy purposes, a user may be inclined to cover the lens (e.g., put a cover over the lens, turn the lens against a wall, et.) at different times of day or while they are participating in certain private actions. However, the shapes of the housings (including lens housings and outer shells) provide for an indication that the lens housing may be manually (or automatically, as described herein) closed by pushing the housing into the outer shell, or vice versa. Other blocking mechanisms may also provide for an indication to the user, either based on the appearance of the mechanisms or otherwise, that they can also be used to manually cover the lens for privacy purposes. For example, a button may be included in the top of the lens housing to provide for a place for a user to push the housing into the outer shell if desired. The button may be touch sensitive or may require additional force to activate a motor, or enough to physically push the housing and lens into the outer shell.

Although FIGS. 28A-C and 29A-C are shown to include housing portions 2818 and 2918, respectively, and outer shell portions 2820 and 2920, respectively, that are divided into specific size and shape structures that fit into each other to create a non-uniform cylindrical shaped video camera 2904, the housings and outer shells may take on a variety of different shapes and sizes. For example, certain portions of the outer shell may be removed and instead be a part of the housing, and certain portions of the housing may be removed and instead be a part of the outer shell. The housings and outer shells may also change in size with respect to each other or other portions of the network video camera.

Any of the video cameras shown in FIGS. 27A-29C (or others shown herein) may be mounted on top of or inside a surface of a piece of furniture, wall, ceiling, etc. For example, the outer shell of an example video camera within embodiments of the present technology may be embedded within a structure such that when the lens and housing exit the outer shell, the lens and housing also exit the surface of the structure (e.g. furniture, wall, ceiling, etc.). Described in a different way, the video camera may be completely or mostly embedded within a structure such that when the video camera is closed (i.e. the housing and lens are inside the outer shell), the video camera is not visible. For example, the top of the housing may be flush with the surface of the furniture, ceiling, wall, etc. such that the entire video camera is not visible when it is not in use and/or closed. In such an embodiment, if the video camera were cylindrical or another appropriate shape, a portion of the camera (e.g. the housing including the lens) may rotate within the outer shell while the housing is protruding out of the outer shell. This relationship may provide for the ability of the user to cause the lens to view at all angles within 360 degrees by rotating around an axis.

Figure 30C:
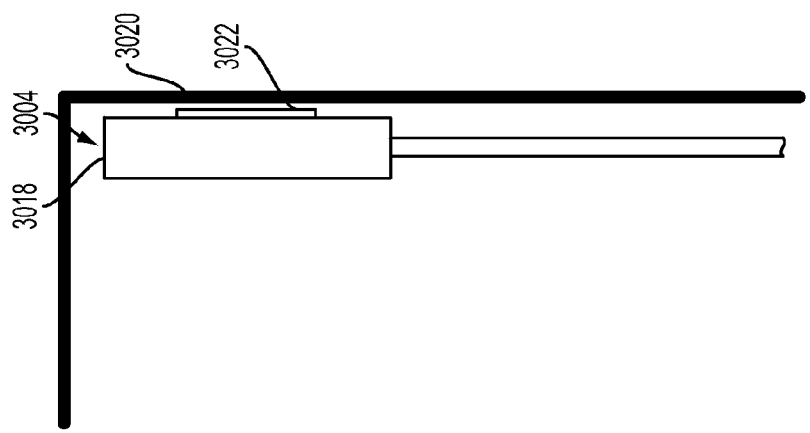
FIG. 30C illustrates an example of a rotating network video camera, in accordance with some embodiments.
Figure 30B:
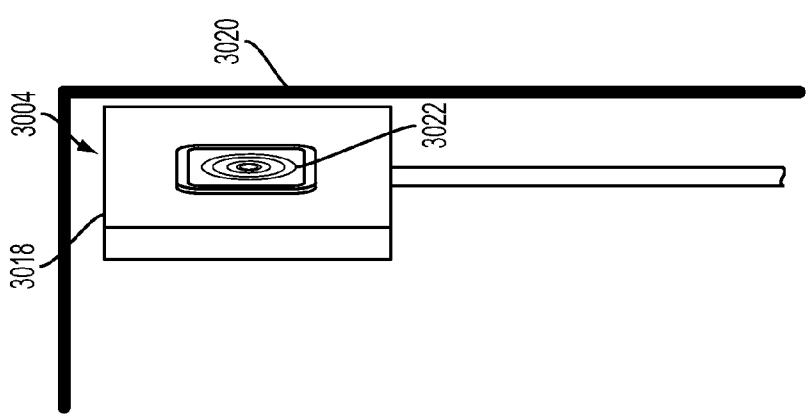
FIG. 30B illustrates an example of a rotating network video camera, in accordance with some embodiments.
Figure 30A:
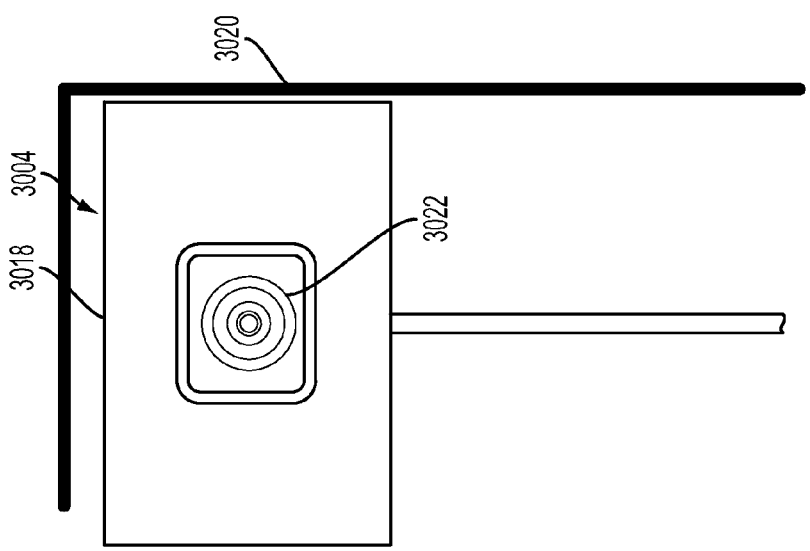
FIG. 30A illustrates an example of a rotating network video camera, in accordance with some embodiments.

FIGS. 30A, 30B and 30C illustrate an example of a rotating network video camera 3004, according to embodiments of the present invention. Network video camera 3004 includes a lens 3022 and a housing 3018. As shown in FIGS. 30A-30C, the lens 3022 may be positioned within housing 3018. FIG. 30A shows a view of network video camera 3004 with lens 3022 fully exposed and not covered. FIG. 30B shows a view of network video camera 3004 with lens 3022 partially exposed and partially covered. FIG. 30C shows a view of network video camera 3004 with lens 3022 blocked because the face of the lens is pointing at a ninety degree angle towards the blocking mechanism, or wall, 3020. However, the lens may rotate more or less than ninety degrees in different embodiments of the present invention. For example, the lens may rotate 180 degrees (not shown) such that the user may only see the back of housing 3018, which may be necessary to block the vision/view of the lens if the lens is a 180 degree camera. The lens may also rotate 95 degrees, 100 degrees, 135 degrees, or any other amount in between 0 and 180 degrees.

FIGS. 30A-30C, similar to FIGS. 24A-24C and FIGS. 25A-25D, illustrate example network video cameras that are configured to block the lens of the video device without using a separate blocking mechanism, according to embodiments of the present invention. Unlike the blocking mechanisms described with respect to FIGS. 15-23, network video camera 3004 is configured to block (and subsequently expose) its lens using an external device, such as wall 3020. Wall 3020 may serve as a blocking mechanism to block part or all of lens 3022 such that lens 3022 may only see and/or record a part or none, respectively, of its environment. The wall 3020 may be closer or farther away from lens 3022. Wall 3020 may also be connected to network video camera 3004, such as connected to housing 3018 or to lens 3022, or other parts of the network video camera.

As noted, embodiments of the present invention, such as network video camera 3004, may include indication devices to indicate to the user or notify the user that the video network device is in a particular state (e.g. lens uncovered and capturing video, or lens covered and not capturing video, etc.). For example, as described herein, the indication device may be represented by a portion of the network video camera 3004, such as lens 3022, that is a different color (or another similar differentiating aesthetic, such as texture, etc.) than the rest of camera 3004. More specifically, a top or side wall/surface of the lens may be a certain color, such as a color that is different from the color of the housing. Therefore, when the lens turns, only certain portions of the colored wall of the lens may be visible to the user when the lens is turned at certain angles. Such a indication device may also be located on a portion of the housing 3018 of the network video device 3004, such that the user may see the indication device while the housing 3018 (and lens 3022) turns or rotates.

Figure 31B:
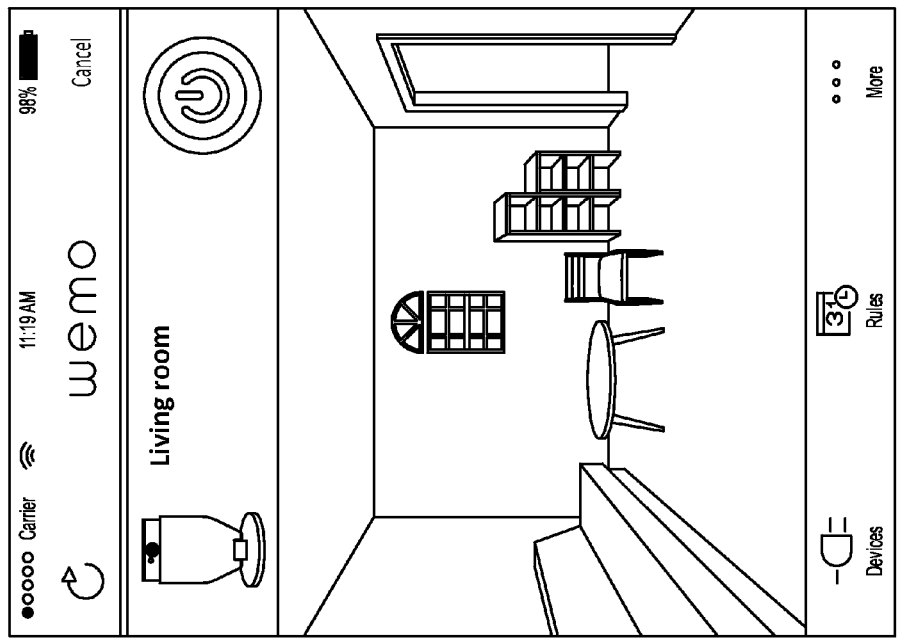
FIG. 31B illustrates a user interface display for an application on an access device, according to embodiments of the present invention.
Figure 31A:
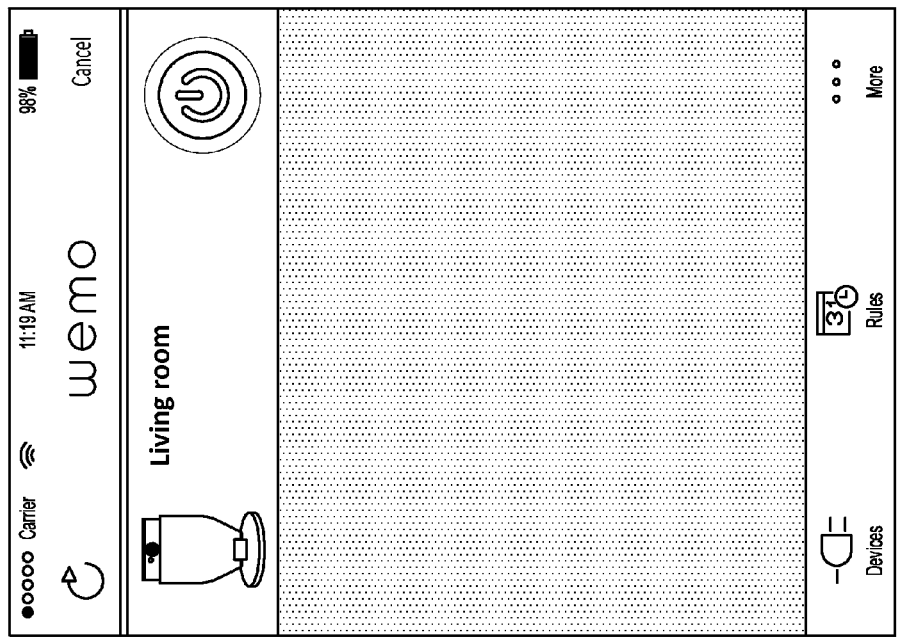
FIG. 31A illustrates a user interface display for an application on an access device, according to embodiments of the present invention.

FIGS. 31A-31B illustrate example embodiments of screenshots of an user interface (UI) display for an application on an access device, according to embodiments of the present invention. However, the UIs are not limited to these example embodiments. In an embodiment of the invention, the visual interfaces illustrated in FIGS. 31A-31B are displayed on a mobile computing device, which can have a touch sensitive (i.e., touch screen) display device. For ease of explanation, the monitoring and control operations discussed below with reference to FIGS. 31A-31B are described in the context of an application executing on an access device 108 with a touch-screen display device. However, the operations are not intended to be limited to the device shown in FIGS. 31A-31B. It is to be understood that the user interfaces illustrated in the embodiments of FIGS. 31A-31B can be readily adapted to be rendered on displays of a variety of computing device platforms running a variety of operating systems. Throughout FIGS. 31A-31B, displays are shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

As noted, a network video camera can be accessed, controlled, and/or configured directly via an interface of the network video camera (e.g., an application, a proprietary program, or any other program executed and operated by the network video camera), or remotely using an interface of a network device or an access device (e.g., an application, a web browser, a proprietary program, or any other program executed and operated by the network device or the access device). FIG. 31A illustrates a user interface display for an application on an access device that shows, among other things, the view of a network video camera communicating with it while the camera is blocked (e.g. by a blocking mechanism), according to embodiments of the present invention. FIG. 31B illustrates a user interface display for an application on an access device that shows, among other things, the view of a network video camera communicating with it while the camera is exposed (i.e. not blocked by a blocking mechanism) and able to view and/or record the environment in front of it, according to embodiments of the present invention. Therefore, although some embodiments of the present invention allow a user to see that the network video camera is not able to view its environment due to a blocking mechanism or other configuration due to an indication device on the network video camera itself, the user may also be able to notice the status of the network video camera remotely. For example, a user may view the display shown in FIG. 31A and notice that the network video camera (i.e. its lens) has been blocked (e.g. because a blocking mechanism was previously activated) due to any of the reasons described herein with respect to various embodiments of the present invention. Alternatively, instead of the display showing a blocked view of the network video camera, the display may show text, a graphic, a video, an animation, or other alternative to indicate to the viewer that the camera is blocked, unavailable, or in privacy mode. Subsequently, if the blocking mechanism is deactivated (e.g. removed from its blocking of the lens of the network video camera), the user may then see the view of the camera lens as the display shown in FIG. 31B because the camera is then able to view the environment in front of it. That environment may include, for example, a couch, table, chair and other home furniture as shown in the display in FIG. 31B.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A network video capture device, comprising:
   a housing in an environment, the housing including a lens connected to the housing, and the housing including an outer surface;
   a blocking mechanism directly coupled to the housing, wherein the blocking mechanism includes an orifice configured to allow the lens to capture light from the environment when the blocking mechanism is in a first position relative to the housing such that the orifice overlaps with the lens, and wherein the blocking mechanism is configured to block the lens from capturing substantially any light from the environment when the blocking mechanism is in a second position relative to the housing such that the orifice does not overlap with the lens;
   wherein the network video capture device provides visual indication when the lens is blocked by the blocking mechanism; and
   a circuit board having a data processor, a wireless transceiver, and a memory configured to store a customizable setting associated with the blocking mechanism.

2. The network video capture device of claim 1, wherein the circuit board is configured to detect an occurrence of an event, and cause the blocking mechanism to block the lens from capturing video images, wherein the blocking mechanism is caused to block the lens when the occurrence of the event is detected.

3. The network video capture device of claim 1, wherein the blocking mechanism is made up of a part of the housing.

4. The network video capture device of claim 1, wherein the lens is configured to operate as a motion sensor, and wherein the blocking mechanism is temporarily deactivated after motion is detected by the lens.

5. The network video capture device of claim 1, wherein when the lens is blocked by the blocking mechanism, the network video capture device is configured to capture audio.

6. The network video capture device of claim 1, wherein the circuit board is configured to generate a command, wherein the command is configured to cause a network device to perform an operation, and wherein the network device and the network video capture device are connected to a local area network over which the command can be transmitted.

7. The network video capture device of claim 1, wherein the customizable setting includes a time period for blocking video capture.

8. The network video capture device of claim 1, wherein the network video capture device includes an LED, a video display, or an audio speaker that provides visual indication when the lens is blocked by the blocking mechanism.

9. The network video capture device of claim 1, wherein the network video capture device comprises a second lens, and wherein the lenses comprise a video capture lens configured to capture video images and a motion sensor lens configured to detect motion.

10. A network video capture device system, comprising:
- a lens;
- a housing connected to the lens, wherein the housing includes an inner shell and an outer shell, wherein the outer shell includes an orifice, and wherein the lens is connected to the inner shell;
- an arm connected to the lens and to the housing, the arm configured to move the lens while the housing is kept stationary, wherein the outer shell of the housing is configured to allow the lens to capture video when the lens is aligned with at least a portion of the orifice of the outer shell, and wherein the outer shell of the housing is configured to prevent the lens from capturing video when the lens is not aligned with at least a portion of the orifice of the outer shell; and
- a processor configured to store a customizable setting associated with the arm and configured to transmit communications to an external network device, wherein the communications include instructions to control the arm.

11. The network video capture device system of claim 10, wherein the network video capture device provides visible feedback that the lens is blocked.

12. The network video capture device system of claim 11, wherein the visible feedback is a part of the housing or the lens.

13. The network video capture device system of claim 11, wherein the network video capture device includes an LED, a video display, or an audio speaker to provide the visible feedback.

14. The network video capture device system of claim 10, wherein the lens is configured to operate as a motion sensor, and wherein the housing is temporarily deactivated after motion is detected by the lens.

15. The network video capture device system of claim 10, wherein when the lens is blocked by the housing, the network video capture device is configured to capture audio.

16. The network video capture device system of claim 10, wherein the processor is configured to generate a command, wherein the command is configured to cause a network device to perform an operation, and wherein the network device and the network video capture device are connected to a local area network over which the command can be transmitted.

17. The network video capture device system of claim 10, wherein the customizable setting includes a time period for blocking video capture.

18. The network video capture device system of claim 10, wherein the network video capture device comprises a second lens, and wherein the lenses comprise a video capture lens configured to capture video images and a motion sensor lens configured to detect motion.

19. The network video capture device system of claim 10, wherein the data processor is located within the housing.

* * * * *